(12) United States Patent
Yoo et al.

(10) Patent No.: US 9,363,506 B2
(45) Date of Patent: Jun. 7, 2016

(54) METHOD OF PROCESSING IMAGE DATA, METHOD OF DISPLAYING IMAGE USING THE SAME AND DISPLAY APPARATUS PERFORMING THE METHOD OF DISPLAYING IMAGE

(75) Inventors: Byoung-Seok Yoo, Incheon (KR); Jun-Pyo Lee, Asan-si (KR); Byung-Kil Jeon, Asan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 384 days.

(21) Appl. No.: 13/089,447

(22) Filed: Apr. 19, 2011

(65) Prior Publication Data

US 2012/0068999 A1 Mar. 22, 2012

(30) Foreign Application Priority Data

Sep. 17, 2010 (KR) .............................. 2010-0091843

(51) Int. Cl.
*G06T 9/00* (2006.01)
*G09G 5/00* (2006.01)
(Continued)

(52) U.S. Cl.
CPC ........... *H04N 13/0497* (2013.01); *G09G 3/003* (2013.01); *G09G 5/397* (2013.01); *G09G 3/3648* (2013.01); *G09G 2310/061* (2013.01); *G09G 2320/0252* (2013.01); *G09G 2320/0285* (2013.01); *G09G 2340/0435* (2013.01); *G09G 2340/16* (2013.01); *G09G 2360/06* (2013.01); *G09G 2360/128* (2013.01)

(58) Field of Classification Search
CPC ..... G09G 2340/02; G09G 5/39; G09G 5/393; G09G 3/3688; G09G 3/3648; G09G 2330/021; G09G 2310/027; G09G 5/006; G09G 3/3406; G09G 2320/0646; G09G 2360/16; G09G 2320/064; G09G 3/2011; G09G 2340/0435; G09G 2360/02; G09G 2360/18; G09G 5/363; G09G 3/003; G09G 5/397; G06T 9/00; G06T 3/4007; G06T 7/2033; H04N 7/26707; H04N 7/0127; H04N 7/0132; H04N 13/0029; H04N 5/243; H04N 13/0497
USPC .......................................... 345/355; 348/448
See application file for complete search history.

(56) References Cited

U.S. PATENT DOCUMENTS 6,943,763 B2 9/2005 Shibata et al.
7,106,380 B2 9/2006 Willis
(Continued)

FOREIGN PATENT DOCUMENTS

CN 1737641 A 2/2006
CN 1804987 A 7/2006
(Continued)

OTHER PUBLICATIONS

Extended European Search Report for Application No. 11003453.5-1904/2432230 dated Sep. 9, 2014.
(Continued)

*Primary Examiner* — Devona Faulk
*Assistant Examiner* — Nicole Gillespie
(74) *Attorney, Agent, or Firm* — Cantor Colburn LLP

(57) ABSTRACT

A method of processing image data comprises storing image frame data in a first memory, repetitively reading the image frame data stored in the first memory to output high frequency image frame data and correcting the high frequency image frame data based on previous frame data.

17 Claims, 27 Drawing Sheets

(51) Int. Cl.
*G09G 3/36* (2006.01)
*H04N 13/04* (2006.01)
*G09G 3/00* (2006.01)
*G09G 5/397* (2006.01)

(56) References Cited

U.S. PATENT DOCUMENTS

| | | |
|---|---|---|
| 8,078,778 B2 | 12/2011 | Fuji |
| 8,345,753 B2 | 1/2013 | Lee et al. |
| 2005/0036673 A1* | 2/2005 | Ohba et al. .................. 382/154 |
| 2005/0146495 A1 | 7/2005 | MacKinnon et al. |
| 2007/0091204 A1* | 4/2007 | Koshimizu et al. ........... 348/441 |
| 2007/0146479 A1 | 6/2007 | Huang et al. |
| 2008/0063048 A1 | 3/2008 | Ouchi et al. |
| 2008/0068359 A1* | 3/2008 | Yoshida et al. ............... 345/204 |
| 2008/0284775 A1 | 11/2008 | Shen et al. |
| 2009/0015531 A1* | 1/2009 | Tsai et al. ...................... 345/89 |
| 2010/0085477 A1* | 4/2010 | Ooishi et al. .................. 348/448 |
| 2010/0231698 A1 | 9/2010 | Nakahata et al. |

FOREIGN PATENT DOCUMENTS

| | | |
|---|---|---|
| CN | 1848230 A | 10/2006 |
| CN | 1984304 A | 6/2007 |
| CN | 101409051 A | 4/2009 |
| CN | 101425277 A | 5/2009 |
| EP | 2202720 A1 | 6/2010 |
| JP | 200291390 A | 3/2002 |
| JP | 2004240410 A | 8/2004 |
| JP | 2006343707 A | 12/2006 |
| JP | 2008141738 A | 6/2008 |
| JP | 2008268672 A | 11/2008 |
| JP | 2008292542 A | 12/2008 |
| JP | 2009109694 A | 5/2009 |
| JP | 2009232249 A | 10/2009 |
| JP | 2010145509 A | 7/2010 |
| JP | 2010282089 A | 12/2010 |

OTHER PUBLICATIONS

Gu, et al., Over Driving (OD) technology for TFT-LCD and its development, TFT-LCD Advanced Display, Apr. 10, 2008, pp. 33-40.

* cited by examiner

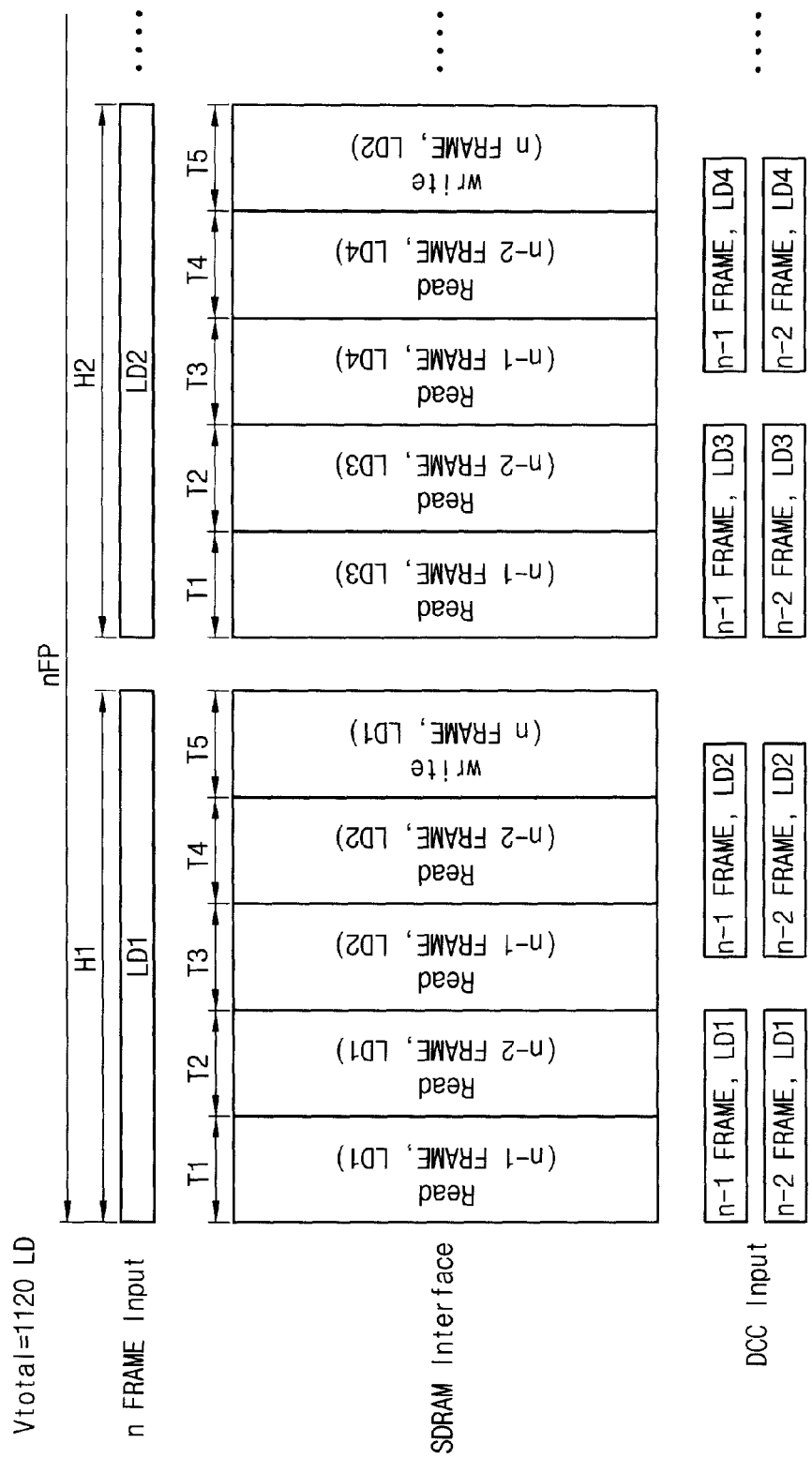

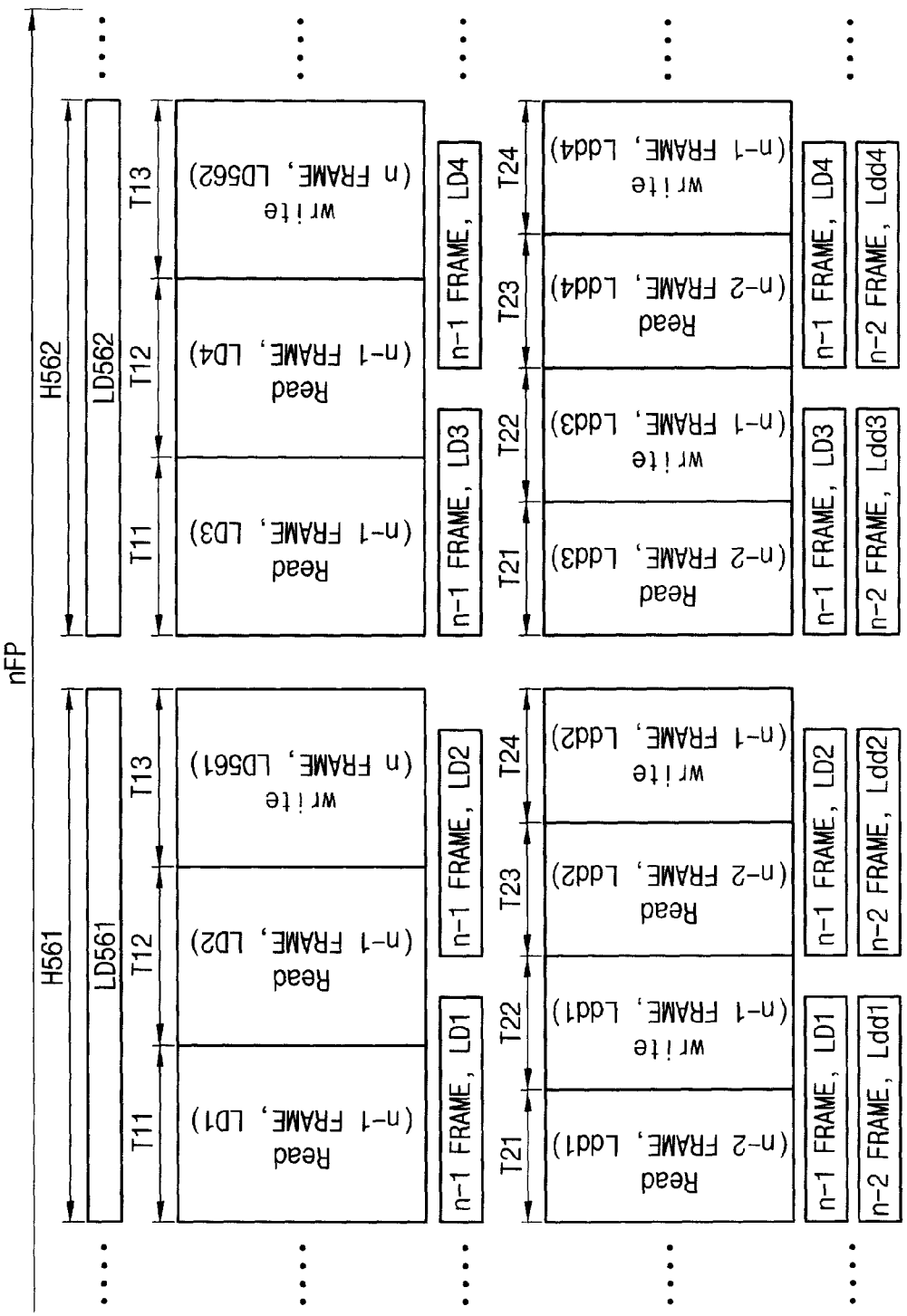

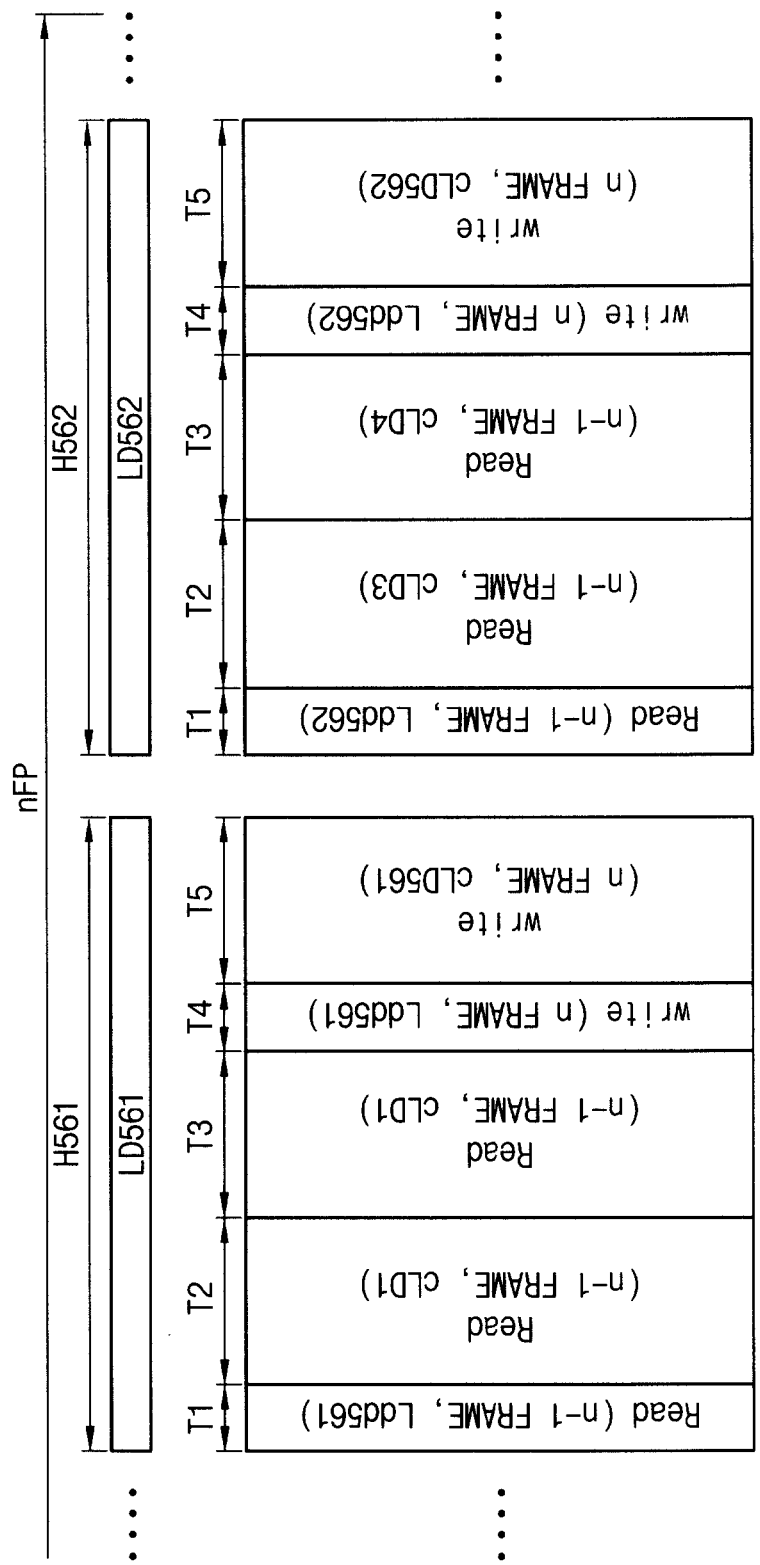

METHOD OF PROCESSING IMAGE DATA, METHOD OF DISPLAYING IMAGE USING THE SAME AND DISPLAY APPARATUS PERFORMING THE METHOD OF DISPLAYING IMAGE

This application claims priority to Korean Patent Application No. 2010-91843, filed on Sep. 17, 2010, and all the benefits accruing therefrom under 35 U.S.C. §119, the content of which in its entirety is herein incorporated by reference.

BACKGROUND OF THE INVENTION

1. Field of the Invention

Exemplary embodiments of the present invention relate to a method of processing image data, a method of displaying an image using the method of processing the image data and a display apparatus performing the method of displaying the image. More particularly, exemplary embodiments of the present invention relate to a method of processing high frequency image data, a method of displaying an image using the method of processing the high frequency image data and a display apparatus performing the method of displaying the image.

2. Description of the Related Art

Generally, a liquid crystal display ("LCD") device displays two-dimensional ("2D") images. Recently however, LCD devices capable of displaying three-dimensional ("3D") stereoscopic images have been developed in order to meet an increasing demand in fields, such as video games, movies, multimedia and other display fields.

Generally, as human eyes see the world from slightly different locations, the images sensed by the eyes are slightly different. This difference in the sensed images is called binocular parallax. Through this natural phenomenon, a user of a stereoscopic image display device is able to view a 3D image.

Generally, a stereoscopic image may be displayed via a shutter-glasses technique or an auto-stereoscopic technique. Typical shutter-glasses techniques include an anaglyph technique, a liquid crystal ("LC") shutter-glasses technique and other various techniques. In the typical implementation of the anaglyph technique, glasses with blue and red color filters, one color for each eye, are worn by a viewer during a viewing of the stereoscopic image. In the typical implementation of the LC shutter-glasses technique, a left image and a right image are alternated rapidly between a left LC shutter glass and a right LC shutter glass, each shutter being synchronized to obstruct the undesired image and transmit the desired image. Thus, each eye sees only its appropriate perspective view i.e., the left eye sees only the left view and the right eye only the right view.

Generally, the LCD employed in the LC shutter-glasses technique is refreshed at a frequency of 240 Hz. Accordingly, the LCD typically uses a frame rate controller ("FRC"), which often is expensive, for displaying image frames with a frequency of 240 Hz. Therefore, the cost of producing the LCD employed in the LC shutter-glasses technique is often higher than that of producing an LCD that displays the 2D image typically refreshed at a frequency of 120 Hz.

BRIEF SUMMARY OF THE INVENTION

Exemplary embodiments of the present invention provide a method of processing image data in a more cost-effective way.

Exemplary embodiments of the present invention also provide a method of displaying an image using the above-mentioned image data processing method.

Exemplary embodiments of the present invention also provide a display apparatus which performs the above-mentioned method of displaying the image.

According to an exemplary embodiment of the present invention, a method of processing image data is provided. In the method, the image frame data is stored in a first memory and repetitively read to output high frequency image frame data, which is corrected based on previous frame data.

According to another exemplary embodiment of the present invention, there is provided a method of processing image data. In the method, the image frame data is corrected based on previous frame data and stored in a first memory, which is repetitively read to output high frequency image frame data.

According to still another exemplary embodiment of the present invention, there is provided a method of displaying an image. In the method, left-eye image data or right-eye image data are stored in a memory. The left-eye image data or the right-eye image data are doubled and corrected by controlling the memory to generate a first and a second left-eye high frequency image frames or a first and a second right-eye high frequency image frames. The high frequency image frames are displayed on a display panel.

According to still another exemplary embodiment of the present invention, a display apparatus includes a display panel, a data processing part and a panel driving part. The display panel displays an image. The data processing part doubles and corrects image frame data stored in a memory to generate high frequency image frame data. The panel driving part displays the high frequency image frames on the display panel based on the high frequency image frame data.

In an exemplary embodiment, the display apparatus may further include a black inserting part which inserts a black image frame between a left-eye image frame and a right-eye image frame. The panel driving part may display the left-eye image frame, the black image frame, the right-eye image frame and another black image frame.

In an exemplary embodiment, the data processing part may include a first memory, a frame doubling part and a data correcting part. The first memory may store the image frame data. The frame doubling part may repetitively read the image frame data stored in the first memory to output the high frequency image frame data. The data correcting part may correct the high frequency image frame data based on previous frame data.

In an exemplary embodiment, the data processing part may include a data correcting part, a first memory and a frame doubling part. The data correcting part may correct the high frequency image frame data based on previous frame data. The first memory may store the corrected image frame data. The frame doubling part may repetitively read the image frame data stored in the first memory to output the high frequency image frame data.

According to an exemplary embodiment of the present invention, the received low frequency image frame may be repetitively generated by using a memory for correcting data or a special memory so that a higher frequency image frame may be generated.

BRIEF DESCRIPTION OF THE DRAWINGS

The above and other features and advantages of the present invention will become more apparent by describing in detailed exemplary embodiments thereof with reference to the accompanying drawings, in which:

FIGS. 4A and 4B are exemplary timing diagrams illustrating input and output signals of the data processing part of FIG. 2;

FIGS. 10A and 10B are exemplary timing diagrams illustrating input and output signals of the data processing part of FIG. 8;

FIGS. 16A and 16B are exemplary timing diagrams illustrating input and output signals of the data processing part of FIG. 14;

DETAILED DESCRIPTION OF THE INVENTION

Figure 1:
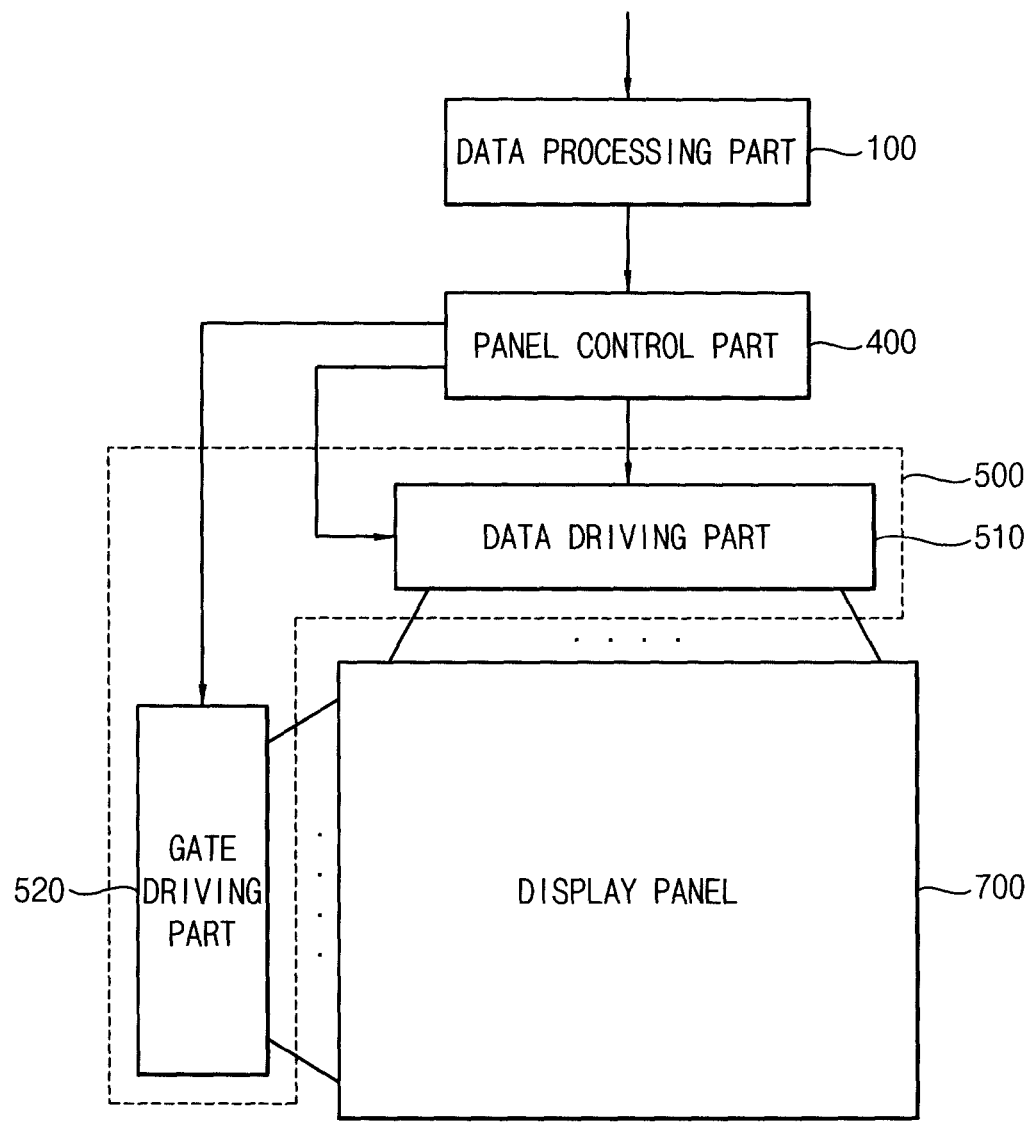
FIG. 1 is a block diagram illustrating exemplary embodiment of a display apparatus according to the present invention.

The present invention is described more fully hereinafter with reference to the accompanying drawings, in which exemplary embodiments of the present invention are shown. The present invention may, however, be embodied in many different forms and should not be construed as limited to the exemplary embodiments set forth herein. Rather, these exemplary embodiments are provided so that this disclosure will be thorough and complete, and will fully convey the scope of the present invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of the present invention will be explained in detail with reference to the accompanying drawings.

FIG. 1 is a block diagram illustrating an exemplary embodiment of a display apparatus according the present invention.

Referring to FIG. 1, the display apparatus includes a data processing part 100, a panel control part 400, a panel driving part 500 and a display panel 700.

The data processing part 100 receives image frame data having a first frequency. The data processing part 100 then doubles the frequency of the image frame data and correspondingly corrects the image frame data. Thus, the data processing part 100 outputs, to the panel control part 400, the image frame data having a second frequency, which is two times higher than the first frequency.

The correction of the image frame data is performed in order to accommodate for over-driving or under-driving of the present frame data based on previous frame data. The correction method may include dynamic capacitance compensation ("DCC"), which is a technology typically used for decreasing an image distortion according to a temperature of a display panel in order to improve a response time of a LC.

In an exemplary embodiment, the first frequency image frame is displayed with the first frequency on the display panel 700. The second frequency image frame is displayed with the second frequency on the display panel 700. Hereinafter, for clarity, the first frequency is referred to as 120 Hz and the second frequency is referred to as 240 Hz.

The panel control part 400 provides the panel driving part 500 with a timing signal and the image frame data The panel driving part 500 includes a data driving part 510 and a gate driving part 520. In an exemplary embodiment, the data driving part 510 converts image frame data of a digital signal received from the panel control part 400 into a data voltage of an analog signal.

The data driving part 510 then provides the data voltage to the display panel 700 based on a data timing signal received from the panel control part 400. The gate driving part 520 generates a gate signal based on a gate timing signal received from the panel control part 400 and provides the gate signal to the display panel 700.

The display panel 700 includes a plurality of data lines, a plurality of gate lines crossing the data lines and a plurality of pixels. Each of the pixels includes a switching element connected to a data line, a gate line and a pixel electrode. The data voltages from the data driving part 510 are applied to data lines and the gate signals from the gate driving part 520 are applied to the gate lines so that the pixels display an image corresponding to the data voltages, respectively.

Figure 2:
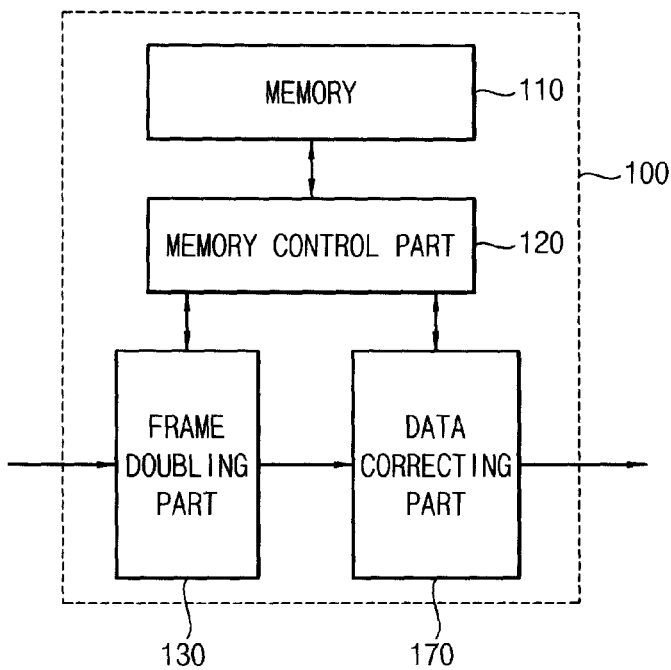
FIG. 2 is a block diagram illustrating exemplary embodiment of a data processing part of FIG. 1.
Figure 3:
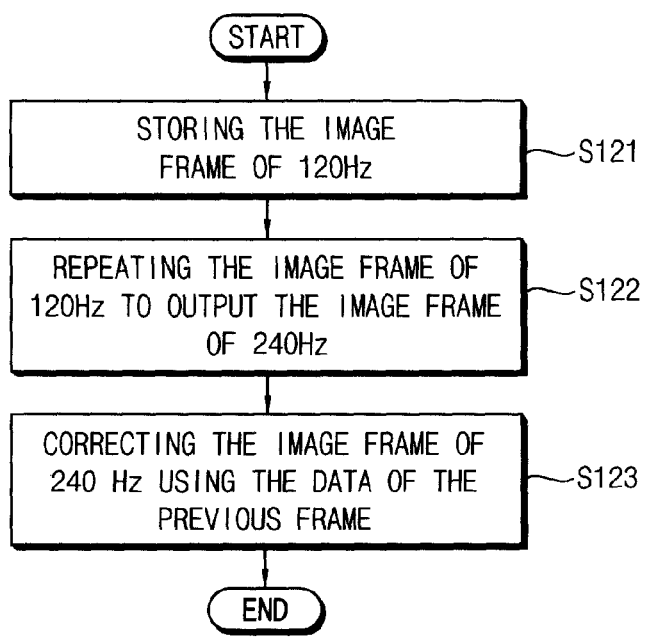
FIG. 3 is a flowchart illustrating an exemplary embodiment of a method for driving the data processing part of FIG. 2.

FIG. 2 is a block diagram illustrating an exemplary embodiment of a data processing part of FIG. 1. FIG. 3 is a flowchart illustrating an exemplary embodiment of a method for driving the data processing part of FIG. 2.

Referring to FIGS. 2 and 3, the data processing part 100 includes a memory 110, a memory control part 120, a frame doubling part 130 and a data correcting part 170.

The memory 110 stores the image frame data of 120 Hz (step S121 in FIG. 3). In an exemplary embodiment, the memory 110 is an external memory. In an exemplary embodiment, the memory 110 is a synchronous DRAM ("SDRAM").

The memory control part 120 controls writing and reading of data in the memory 110. This control is performed for processing the data of the frame doubling part 130 and the data correcting part 170.

The frame doubling part 130 repeats the image frame data of 120 Hz using the memory 110 in order to output the image frame of 240 Hz (step S122 in FIG. 3).

In an exemplary embodiment, in a 3D image mode, the frame doubling part 130 repeats a left-eye image frame data and a right-eye image frame data, both at 120 Hz, in order to output a first left-eye image frame, a second left-eye image frame, a first right-eye image frame and a second right-eye image frame, all at 240 Hz. In a 2D image mode, the frame doubling part 130 repeats an original image frame and an interpolation image frame, both at 120 Hz, in order to output a first original image frame, a second original image frame, a first interpolation image frame and a second interpolation image frame, all at 240 Hz. In an exemplary embodiment, the frame doubling part 130 repeats the image frames of 120 Hz in order to output the image frames of 240 Hz.

The data correcting part 170 includes a look-up table ("LUT") that stores correction data of over-driving and under-driving as a table type. The data correcting part 170 outputs the correction data stored in the LUT corresponding to the present frame data and reference data, which is the previous frame data stored in the memory 110 (step S123 in FIG. 3). The correction data is correction data for the present frame.

In an exemplary embodiment, in the 3D image mode, the data correcting part 170 corrects the present frame data, including data of 240 Hz comprising of a first left-eye image frame, a second left-eye image frame, a first right-eye image frame and a second right-eye image frame. The data correcting part 170 corrects the present frame data based on the previous frame data stored in the memory 110.

In an exemplary embodiment, in the 2D image mode, the data correcting part 170 corrects the present frame data, including data of 240 Hz comprising a first original image frame, a second original image frame, a first interpolation image frame and a second interpolation image frame. The data correcting part 170 corrects the present frame data based on the previous frame data stored in the memory 110.

Figure 4B:
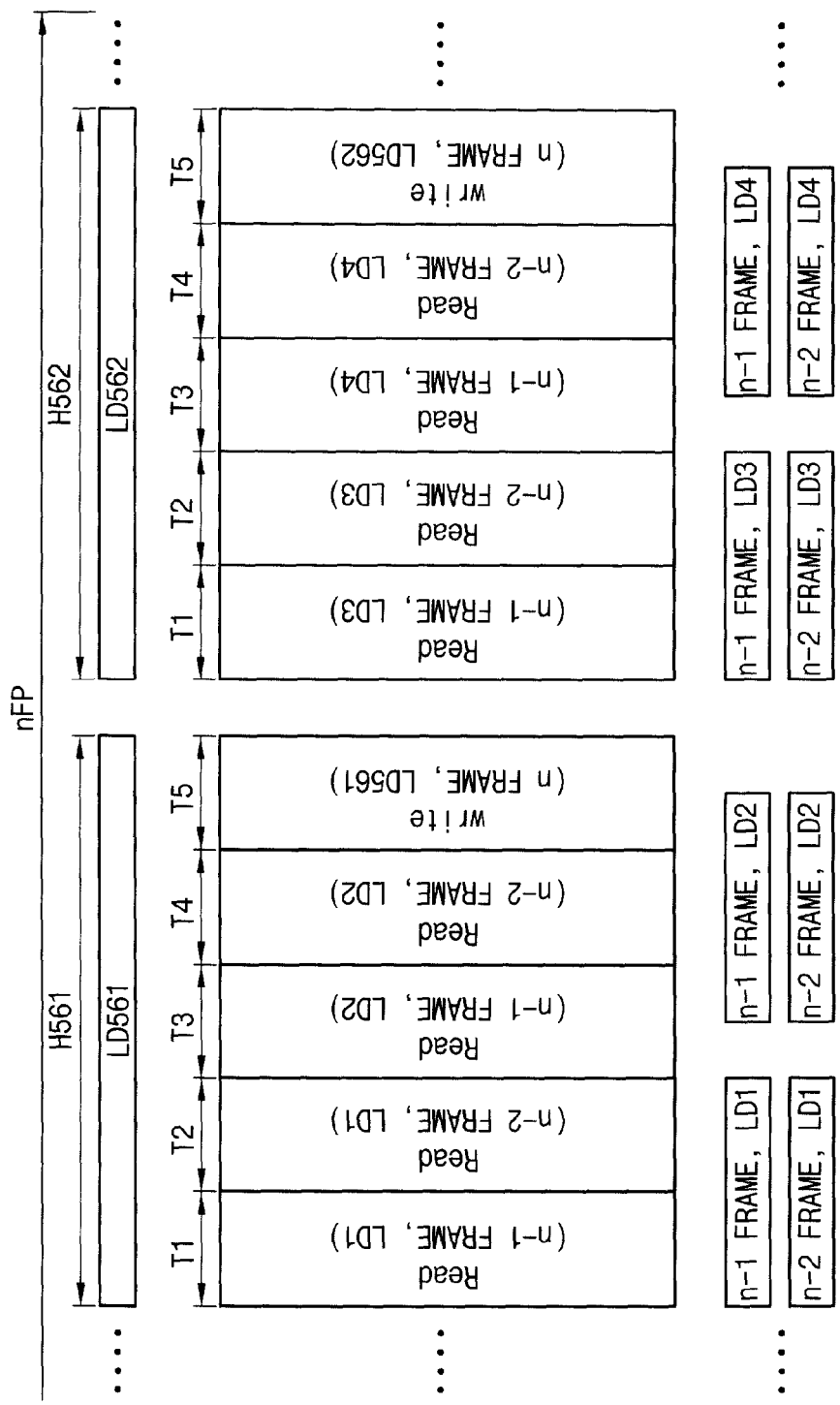

FIGS. 4A and 4B are exemplary timing diagrams illustrating input and output signals of the data processing part of FIG. 2. A horizontal axis (x-axis) indicates a time and a vertical axis (y-axis) indicates data in FIGS. 4A and 4B. The horizontal axis in FIG. 4B is extended from the horizontal axis in FIG. 4A.

Referring to FIGS. 2 and 4A, subsequently explained is an operation of the data processing part 100 when an n-th image frame n FRAME having data of 1120 horizontal lines is received. Herein, for clarity, n is a natural number.

The memory control part 120 controls writing and reading of the memory 110. In an exemplary embodiment, the memory control part 120 writes the received data in the memory 110 and provides the read data, stored in the memory 110, to the frame doubling part 130 and the data correcting part 170.

In an exemplary embodiment, during a first horizontal period H1 in which first line data LD1 of the n-th image frame n FRAME is input, the memory control part 120 divides the first horizontal period H1 into 5 sub periods T1, T2, T3, T4, T5 and controls writing and reading of the memory 110 in each of the sub periods T1, T2, T3, T4, T5.

During the first sub period T1, the memory control part 120 reads first line data LD1 of an (n−1)-th image frame (n−1) FRAME in the memory 110 and provides the first line data LD1 of the (n−1)-th image frame (n−1) FRAME to the frame doubling part 130 and the data correcting part 170.

During the second sub period T2, the memory control part 120 reads first line data LD1 of an (n−2)-th image frame (n−2) FRAME in the memory 110 and provides the first line data LD1 of the (n−2)-th image frame (n−2) FRAME to the data correcting part 170.

During the third sub period T3, the memory control part 120 reads second line data LD2 of the (n−1)-th image frame (n−1) FRAME in the memory 110 and provides the second line data LD2 of the (n−1)-th image frame (n−1) FRAME to the frame doubling part 130 and the data correcting part 170.

During the fourth sub period T4, the memory control part 120 reads second line data LD2 of the (n−2)-th image frame (n−2) FRAME in the memory 110 and provides the second line data LD2 of the (n−2)-th image frame (n−2) FRAME to the data correcting part 170.

During the fifth sub period T5, the memory control part 120 writes the first line data LD1 of the n-th image frame n FRAME in the memory 110. During the first to fourth sub periods T1 to T4, the first line data LD1 of the n-th image frame n FRAME is buffered.

The frame doubling part 130 receives the first line data LD1 and the second line data LD2 of the (n−1)-th image frame (n−1) FRAME received during the first sub period T1 and the third sub period T3. During the first horizontal period H1, the frame doubling part 130 outputs the first line data LD1 and the second line data LD2 of the (n−1)-th image frame (n−1) FRAME.

The data correcting part 170 corrects the first line data LD1 of the (n−1)-th frame (n−1) FRAME received during the first sub period T1 based on the first line data LD1 of the (n−2)-th frame (n−2) FRAME received during the second sub period T2. The data correcting part 170 corrects the second line data LD2 of the (n−1)-th frame (n−1) FRAME received during the third sub period T3 based on the second line data LD2 of the (n−2)-th frame (n−2) FRAME received during the fourth sub period T4. The data correcting part 170 corrects the first and second line data LD1 and LD2 of the (n−1)-th image frame (n−1) FRAME and outputs the corrected first and second line data LD1 and LD2 of the (n−1)-th image frame (n−1) FRAME during the first horizontal period H1.

As previously described, during a second horizontal period H2 in which the second line data LD2 of the n-th image frame n FRAME is received, the data correcting part 170 corrects third and fourth line data LD3 and LD4 of the (n−1)-th image frame (n−1) FRAME and outputs the corrected third and fourth line data LD3 and LD4 of the (n−1)-th image frame (n−1) FRAME.

Therefore, in an exemplary embodiment, during a 560-th horizontal period in which 560-th line data corresponding to a middle of the n-th image frame n FRAME is input, the data correcting part 170 corrects 1119-th and 1120-th line data of the (n−1)-th image frame (n−1) FRAME and outputs the corrected 1119-th and 1120-th line data of the (n−1)-th image frame (n−1) FRAME. In an exemplary embodiment, during a former half period of an n-th frame period n FP in which the n-th image frame n FRAME is input, the data processing part 100 outputs the corrected (n−1)-th image frame (n−1) FRAME.

Referring to FIG. 4B, during a latter half period of the n-th frame period n FP, the data processing part 100 outputs the (n−1)-th image frame (n−1) FRAME once more.

Thus, the data processing part 100 outputs the corrected (n−1)-th image frame (n−1) FRAME twice during the n-th frame period n FP. Therefore, the data processing part 100 outputs the image frame data of 120 Hz into the image frame data of 240 Hz.

Hereinafter, for clarity, the same reference numerals will be used to refer to the same or like parts as those described in the previous exemplary embodiment and any repetitive detailed explanation will be omitted.

Figure 5:
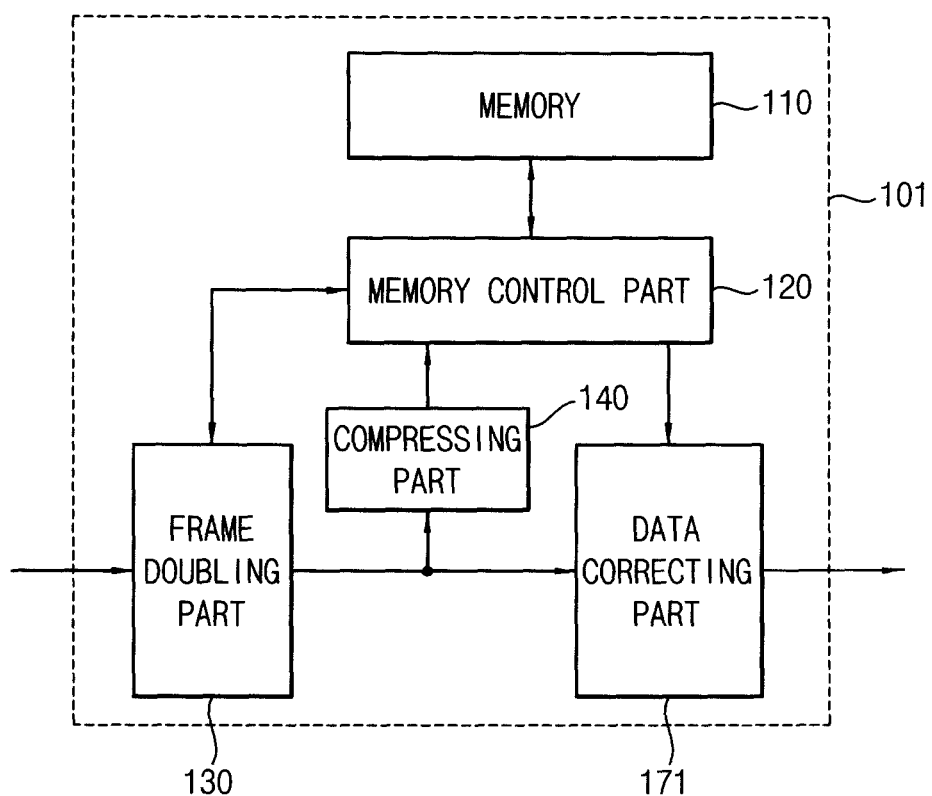
FIG. 5 is a block diagram illustrating exemplary embodiment of a data processing part according to the present invention.
Figure 6:
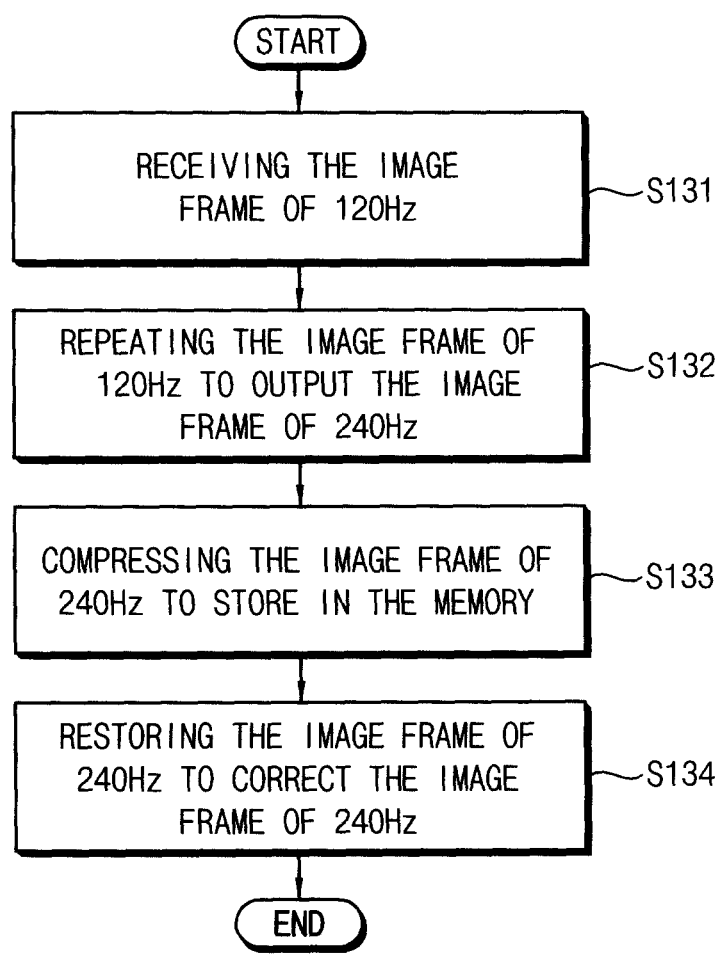
FIG. 6 is a flowchart illustrating an exemplary embodiment of a method for driving the data processing part of FIG. 5.

FIG. 5 is a block diagram illustrating an exemplary embodiment of a data processing part according to the present invention. FIG. 6 is a flowchart illustrating an exemplary embodiment of a method for driving the data processing part of FIG. 5.

Referring to FIGS. 5 and 6, the data processing part 101 includes a memory 110, a memory control part 120, a frame doubling part 130, a compressing part 140 and a data correcting part 171.

The memory 110 stores the image frame data of 120 Hz (step S131 in FIG. 6). In an exemplary embodiment, the memory 110 is an external memory. In an exemplary embodiment, the memory 110 is SDRAM.

The memory control part 120 controls writing and reading of data in the memory 110. This control is performed for processing data of the frame doubling part 130 and the data correcting part 171.

The frame doubling part 130 repeats the image frame data of 120 Hz stored in the memory 110 to output the image frame data of 240 Hz (step S132 in FIG. 6).

The compressing part 140 compresses the image frame data of 240 Hz for storage in the memory 110 (step S133 in FIG. 6). In an exemplary embodiment, the data compressed by the compressing part 140 is used as reference data in the data correcting part 171. In an exemplary embodiment, a data loss due to a data compression has no effect on correction data generated by the data correcting part 171. However, a data rate of the memory 110 may be decreased by the data compression. In an exemplary embodiment, when the compressing part 140 compresses the image frame data bits by about ⅓, the data rate may be about ⅘ times lower than that of the non-compressed data in the previously described exemplary embodiment.

In an exemplary embodiment, the data correcting part 171 includes a LUT that stores correction data as a table type. The data correcting part 171 receives the previous frame compressed data stored in the memory 110 for correcting a present frame data received from the frame doubling part 130. The data correcting part 171 restores the compressed data into original data having original bits and then uses the restored data as reference data for the present frame data. The data correcting part 171 corrects the present frame data into correction data based on the restored data (step S134 in FIG. 6). In an exemplary embodiment, the correction data is overdriven or under-driven present frame data and is stored in the LUT.

Figure 7A:
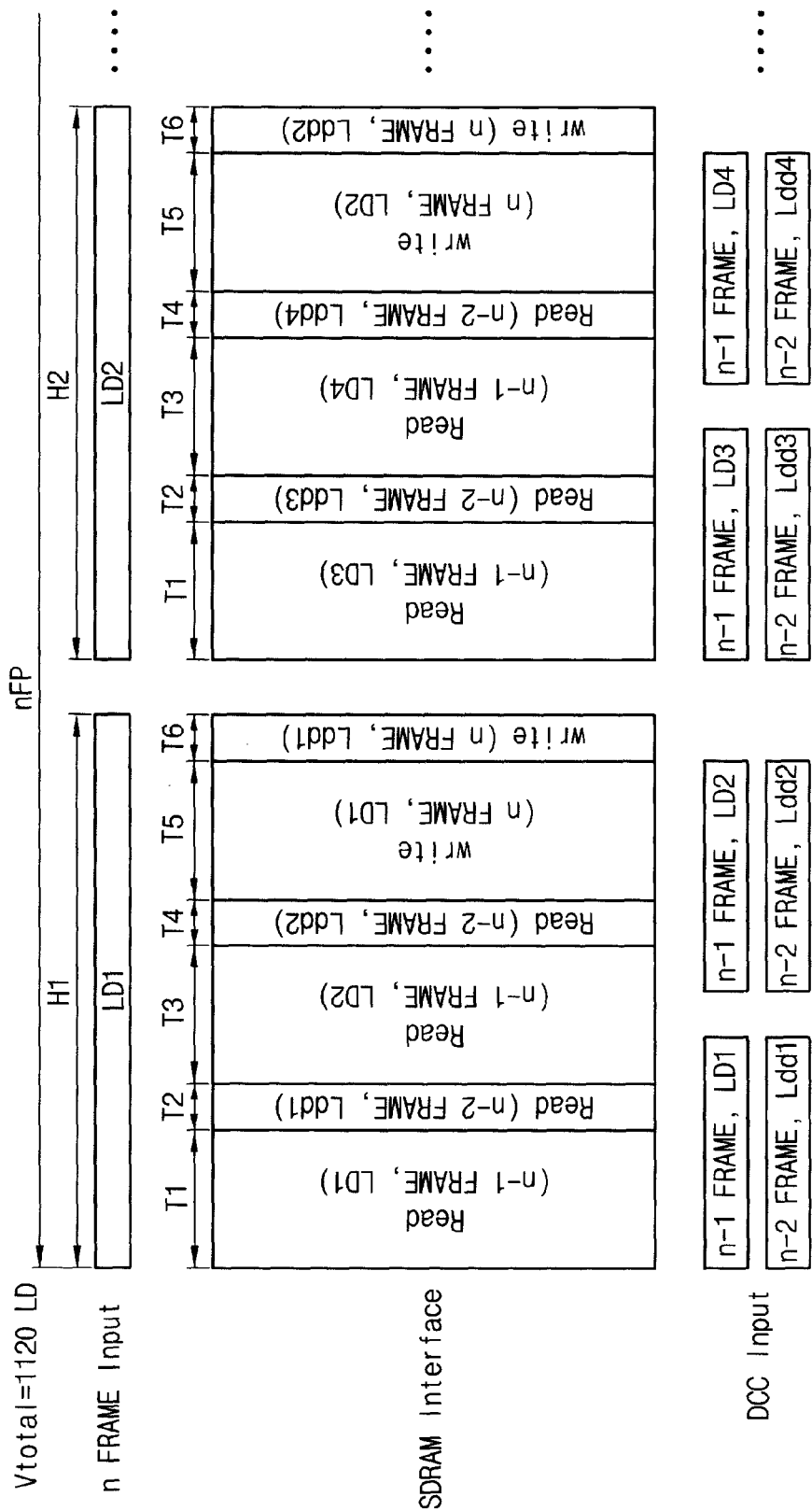
FIGS. 7A and 7B are exemplary timing diagrams illustrating input and output signals of the data processing part of FIG. 5.
Figure 7B:
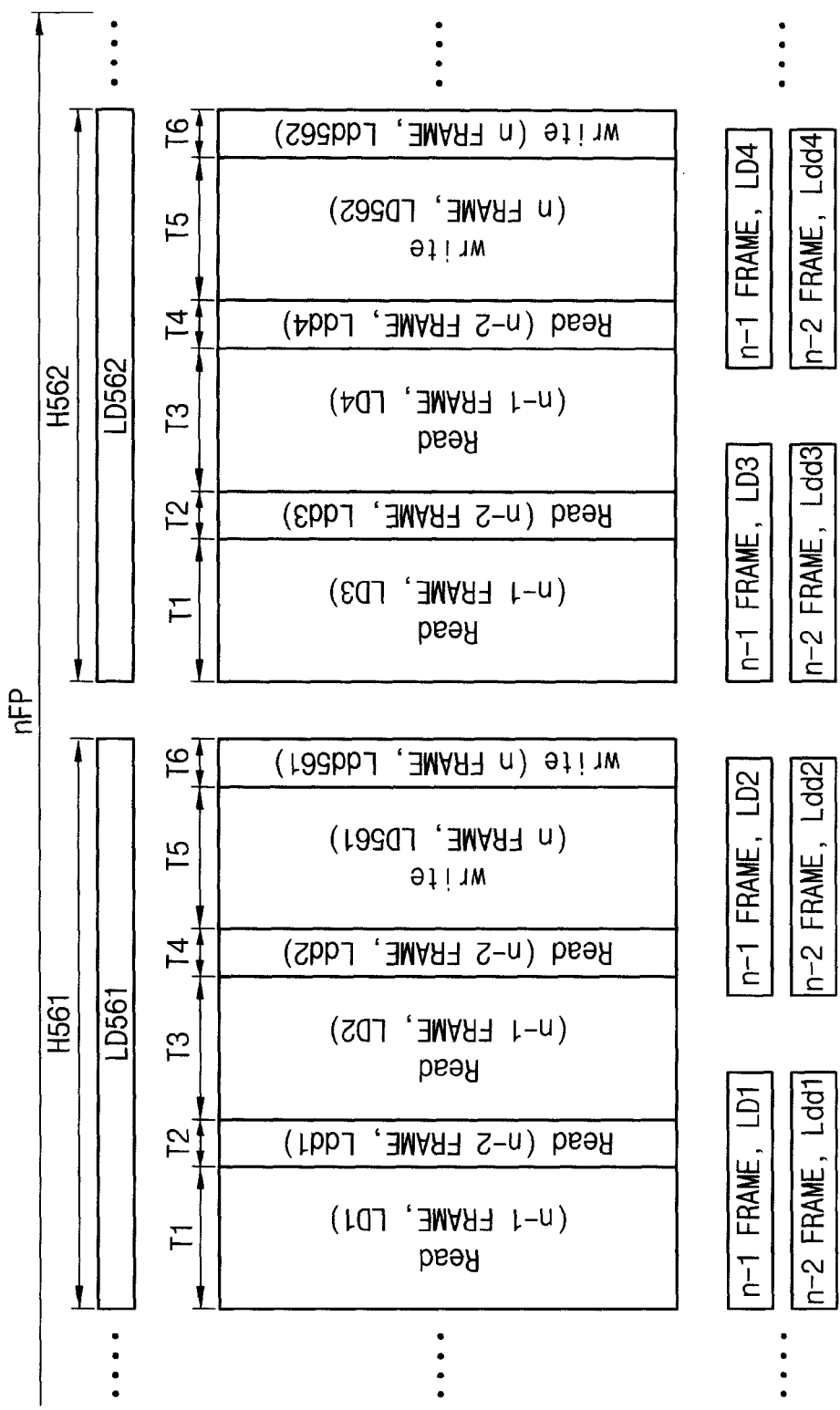

FIGS. 7A and 7B are exemplary timing diagrams illustrating input and output signals of the data processing part of FIG. 5. A horizontal axis (x-axis) indicates a time and a vertical axis (y-axis) indicates data in FIGS. 7A and 7B. The horizontal axis in FIG. 7B is extended from the horizontal axis in FIG. 7A.

Referring to FIGS. 5 and 7A, subsequently explained is an operation of the data processing part 101 when an n-th image frame n FRAME is received. Here, for clarity, the n-th image frame is the image frame including data of 1120 horizontal lines.

The memory control part 120 controls writing and reading of the memory 110. In an exemplary embodiment, the memory control part 120 writes the received data in the memory 110 and provides the read data, stored in the memory 110, to the frame doubling part 130 and the data correcting part 171.

In an exemplary embodiment, during the first horizontal period H1 in which first line data LD1 of the n-th image frame n FRAME is received, the memory control part 120 divides the first horizontal period H1 into 6 sub periods T1, T2, T3, T4, T5, T6 and controls writing and reading of the memory 110 during each of the sub periods T1, T2, T3, T4, T5, T6.

During the first sub period T1, the memory control part 120 reads first line data LD1 of an (n−1)-th image frame (n−1) FRAME in the memory 110 and provides the first line data LD1 of the (n−1)-th image frame (n−1) FRAME to the frame doubling part 130 and the data correcting part 171.

During the second sub period T2, the memory control part 120 reads first line data Ldd1 of an (n−2)-th image frame (n−2) FRAME in the memory 110 and provides the first line data Ldd1 of the (n−2)-th image frame (n−2) FRAME to the data correcting part 171. The first line data Ldd1 is the compressed data.

During the third sub period T3, the memory control part 120 reads second line data LD2 of the (n−1)-th image frame (n−1) FRAME in the memory 110 and provides the second line data LD2 of the (n−1)-th image frame (n−1) FRAME to the frame doubling part 130 and the data correcting part 171.

During the fourth sub period T4, the memory control part 120 reads second line data Ldd2 of the (n−2)-th image frame (n−2) FRAME in the memory 110 and provides the second line data Ldd2 of the (n−2)-th image frame (n−2) FRAME to the data correcting part 170. The second line data Ldd2 is the compressed data.

During the fifth sub period T5, the memory control part 120 writes the first line data LD1 of the n-th image frame n FRAME in the memory 110. During the first to fourth sub periods T1 to T4, the first line data LD1 of the n-th image frame n FRAME is buffered.

During the sixth sub period T6, the memory control part 120 writes the compressed first line data Ldd1 of the n-th image frame n FRAME in the memory 110.

During the first sub period T1 and the third sub period T3, the frame doubling part 130 receives the first line data LD1 and the second line data LD2 of the (n−1)-th image frame (n−1) FRAME. During the first horizontal period H1, the frame doubling part 130 outputs the first line data LD1 and the second line data LD2 of the (n−1)-th image frame (n−1) FRAME.

The data correcting part 171 restores the first line data Ldd1 of the (n−2)-th image frame (n−2) FRAME received during the second sub period T2 into original data. The data correcting part 171 corrects the first line data LD1 of the (n−1)-th frame received during the first sub period T1 based on the restored first line data of the (n−2)-th image frame (n−2) FRAME.

The data correcting part 171 restores the second line data Ldd2 of the (n−2)-th image frame (n−2) FRAME received during the fourth sub period T4 into original data. The data correcting part 171 corrects the second line data LD2 of the (n−1)-th frame received during the third sub period T3 based on the restored second line data of the (n−2)-th image frame (n−2) FRAME.

In an exemplary embodiment, a bandwidth of each of the first, third and fifth sub periods, i.e. T1, T3 and T5, is different from that of each of the second, fourth and sixth sub periods, i.e. T2, T4 and T6, according to a compression rate as provided by the compression part 140.

As previously described, during a second horizontal period H2 in which the second line data LD2 of the n-th image frame n FRAME is received, the data correcting part 171 corrects third and fourth line data LD3 and LD4 of the (n−1)-th image frame (n−1) FRAME and outputs the corrected third and fourth line data LD3 and LD4 of the (n−1)-th image frame (n−1) FRAME.

Therefore, in an exemplary embodiment, during a 560-th horizontal period corresponding to a middle of the image frame n FRAME in which 560-th line data is received, the data correcting part 171 corrects 1119-th and 1120-th line data of the (n−1)-th image frame (n−1) FRAME and outputs the corrected 1119-th and 1120-th line data of the (n−1)-th image frame (n−1) FRAME. In an exemplary embodiment, during a former half period of an n-th frame period n FP, the data processing part 101 outputs the (n−1)-th image frame (n−1) FRAME.

Referring to FIG. 7B, during a latter half period of the n-th frame period n FP, the data processing part 101 outputs the (n−1)-th image frame (n−1) FRAME once more.

Thus, the data processing part 101 outputs the corrected (n−1)-th image frame (n−1) FRAME twice during the n-th frame period n FP. Therefore, the data processing part 101 outputs the image frame data of 120 Hz into the image frame data of 240 Hz.

Figure 8:
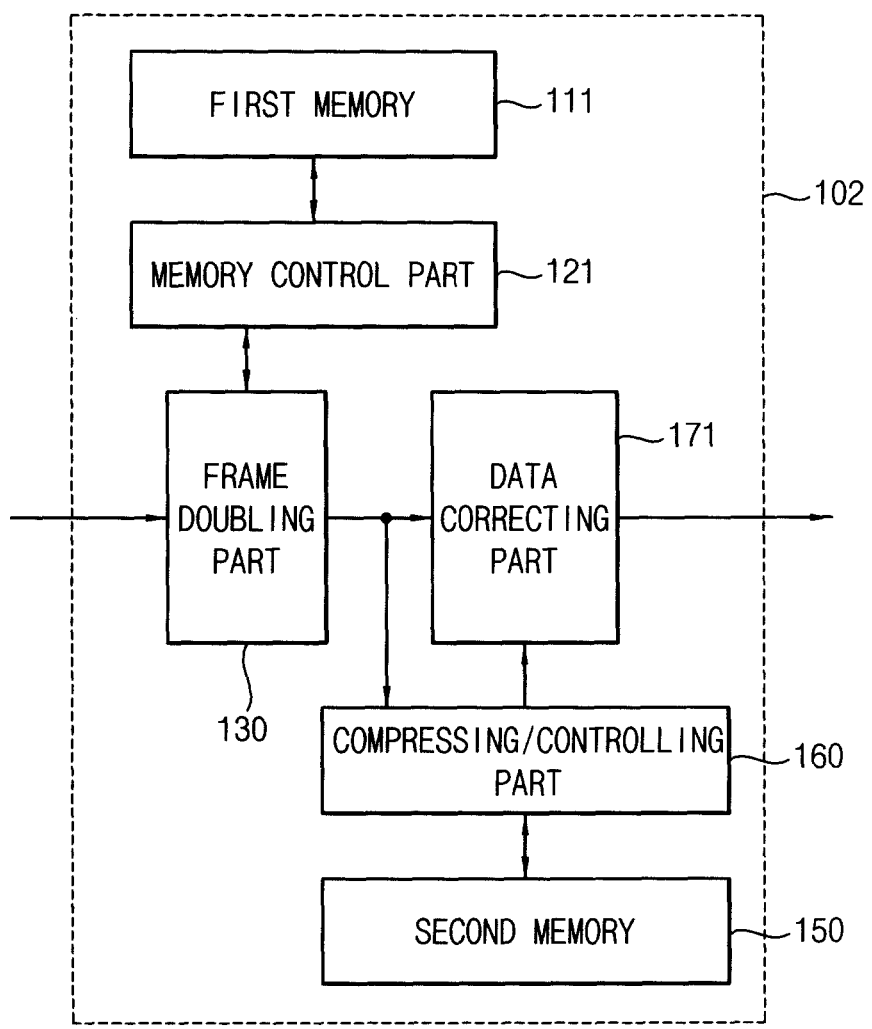
FIG. 8 is a block diagram illustrating exemplary embodiment of a data processing part according to the present invention.
Figure 9:
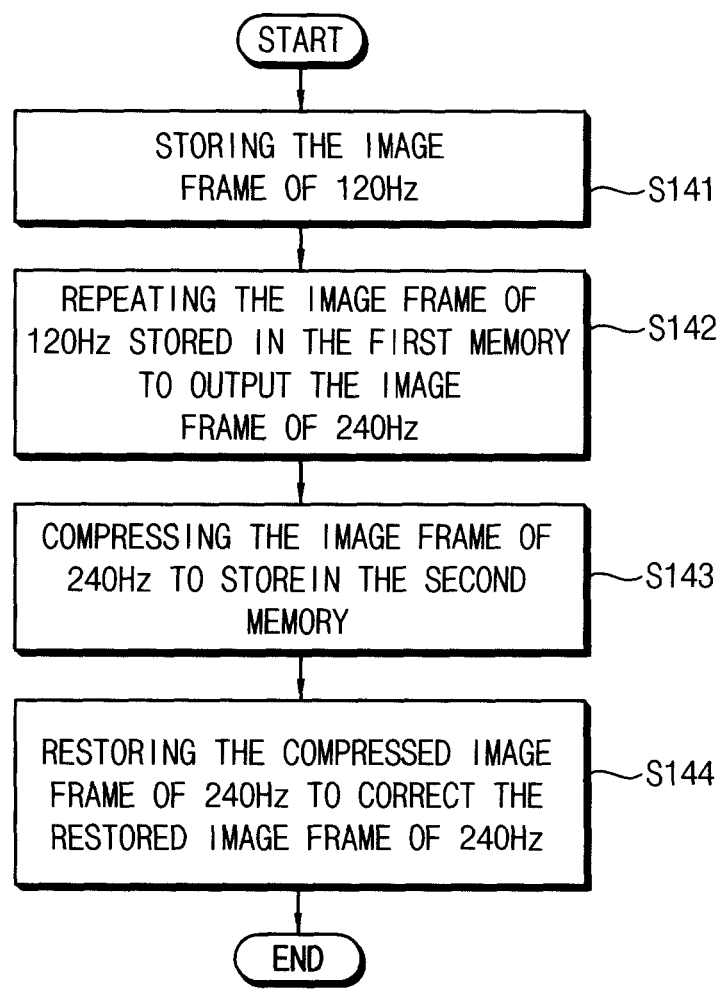
FIG. 9 is a flowchart illustrating an exemplary embodiment of a method for driving the data processing part of FIG. 8.

FIG. 8 is a block diagram illustrating an exemplary embodiment of a data processing part according to the present invention. FIG. 9 is a flowchart illustrating an exemplary embodiment of a method for driving the data processing part of FIG. 8.

Referring to FIGS. 8 and 9, the data processing part 102 includes a first memory 111, a memory control part 121, a frame doubling part 130, a second memory 150, a compressing/controlling part 160 and a data correcting part 171.

The first memory 111 stores an image frame of 120 Hz (step S141 in FIG. 9). In an exemplary embodiment, the first memory 111 is an external memory. In an exemplary embodiment, the first memory 111 is SDRAM.

The memory control part 121 controls writing and reading of data in the first memory 111. The control is performed for processing data of the frame doubling part 130.

The frame doubling part 130 repeats the image frame data of 120 Hz stored in the first memory 111 in order to output the image frame of 240 Hz (step S142 in FIG. 9).

The second memory 150 stores the compressed image frame data of 240 Hz for processing data of the data correcting part 171. In an exemplary embodiment, the second memory 150 is an embedded DRAM (eDRAM).

The compressing/controlling part 160 compresses the image frame data of 240 Hz received from the frame doubling part 130 and stores the compressed image frame data in the second memory 150 (step S143 in FIG. 9). The compressing/controlling part 160 controls writing and reading of data in the second memory 150. The control is performed for processing data of the data correcting part 171.

The data correcting part 171 includes a LUT that stores correction data of over-driving and under-driving as a table type. The data correcting part 171 receives the previous frame compressed data from the second memory 150 for correcting the present frame data received from the frame doubling part 130. The data correcting part 171 restores the compressed data into original data and uses the restored data as a reference data for the present frame data. The data correcting part 171 corrects the present frame data into a correction data based on the restored data (step S144 in FIG. 9). In an exemplary embodiment, the correction data is over-driven or under-driven present frame data and is stored in the LUT.

In an exemplary embodiment, by using the second memory 150 for processing data of the data correcting part 171, the first memory 111 is used for processing data of the frame doubling part 130. Thus, a data rate of the first memory 111 is decreased.

In addition, in an exemplary embodiment, the second memory 150 stores the compressed data so that a size of the second memory 150 is decreased.

Figure 10A:
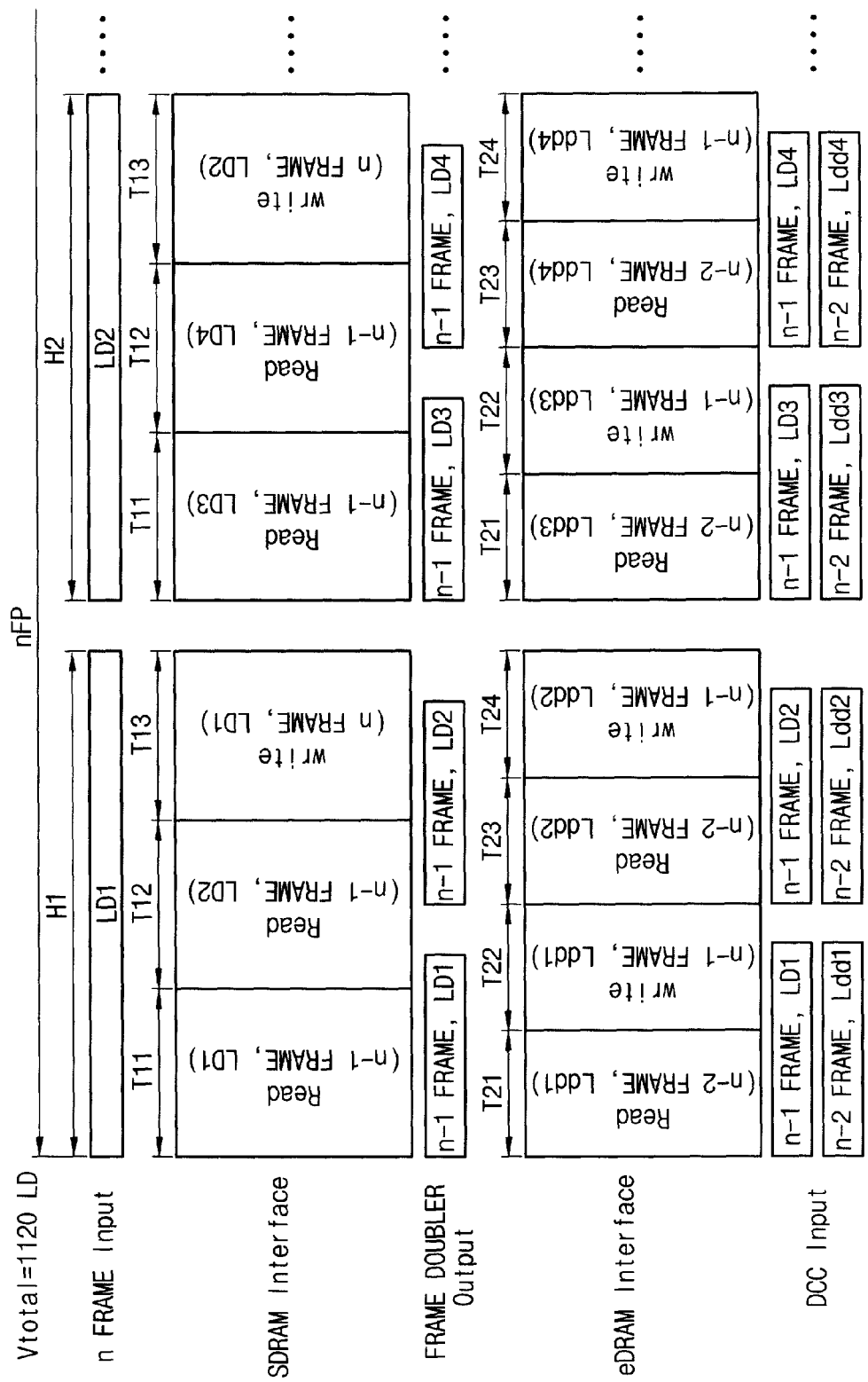

FIGS. 10A and 10B are exemplary timing diagrams illustrating input and output signals of the data processing part of FIG. 8. A horizontal axis (x-axis) indicates a time and a vertical axis (y-axis) indicates data in FIGS. 8A and 8B. The horizontal axis in FIG. 8B is extended from the horizontal axis in FIG. 8.

Referring to FIGS. 8 and 10A, subsequently explained is an operation of the data processing part 102 when an n-th image frame n FRAME having data of 1120 horizontal lines is received.

The memory control part 121 controls writing and reading of the first memory 111. In exemplary embodiment, the memory control part 121 writes the received data in the first memory 111 and provides the read data, stored in the first memory 111, to the frame doubling part 130.

In an exemplary embodiment, during a first horizontal period H1 in which first line data of the n-th image frame n FRAME is input, the memory control part 121 divides the first horizontal period H1 into 3 sub periods T11, T12, T13 and controls writing and reading of the first memory 111 during each of the sub periods T11, T12, T13.

During the first sub period T11, the memory control part 121 reads first line data LD1 of an (n−1)-th image frame (n−1) FRAME in the first memory 111 and provides the first line data LD1 of an (n−1)-th image frame (n−1) FRAME to the frame doubling part 130.

During the second sub period T12, the memory control part 121 reads second line data LD2 of an (n−2)-th image frame (n−2) FRAME in the first memory 111 and provides the second line data LD2 of an (n−2)-th image frame (n−2) FRAME to the frame doubling part 130.

During the third sub period T13, the memory control part 121 writes the first line data LD1 of the n-th image frame n FRAME in the first memory 111. During the first and second sub periods T11 and T12, the first line data LD1 of the n-th image frame n FRAME is buffered.

During the first sub period T11 and the second sub period T12, the frame doubling part 130 receives the first line data LD1 and the second line data LD2 of the (n−1)-th image frame (n−1) FRAME. During the first horizontal period H1, the frame doubling part 130 outputs the first line data LD1 and the second line data LD2 of the (n−1)-th image frame (n−1) FRAME.

The compressing/controlling part 160 compresses the image frame data received from the frame doubling part 130. Thereafter, the compressing/controlling part 160 controls writing and reading of the second memory 150. In an exemplary embodiment, the compressing/controlling part 160 writes the compressed data to the second memory 150 and reads the compressed data from the second memory 150.

In an exemplary embodiment, during a first horizontal period H1 in which first line data of the n-th image frame n FRAME is input, the compressing/controlling part 160 divides the first horizontal period H1 into 4 sub periods T21, T22, T23, T24 and controls writing and reading of the second memory 150 during each of the sub periods sub periods T21, T22, T23, T24.

The compressing/controlling part 160 reads first line data Ldd1 of an (n−2)-th image frame (n−2) FRAME in the second memory 150 and provides the first line data Ldd1 of the (n−2)-th image frame (n−2) FRAME to the data correcting part 171 during the first sub period T21. The first line data Ldd1 of the (n−2)-th image frame (n−2) FRAME is the compressed data.

During the second sub period T22, the compressing/controlling part 160 writes first line data Ldd1 of an (n−1)-th image frame (n−1) FRAME in the second memory 150. The first line data Ldd1 of the (n−1)-th image frame (n−1) FRAME is the compressed data.

The compressing/controlling part 160 reads second line data Ldd2 of the (n−2)-th image frame (n−2) FRAME in the second memory 150 and provides the second line data Ldd2 of the (n−2)-th image frame (n−2) FRAME to the data correcting part 171 during the third sub period T23. The second line data Ldd2 of the (n−2)-th image frame (n−2) FRAME is the compressed data.

During the fourth sub period T24, the compressing/controlling part 160 writes second line data Ldd2 of the (n−1)-th image frame (n−1) FRAME in the second memory 150. The second line data Ldd2 of the (n−1)-th image frame (n−1) FRAME is the compressed data.

The data correcting part 171 restores the first line data Ldd1 of the (n−2)-th image frame (n−2) FRAME, received during the first sub period T21, into original data. The data correcting part 171 corrects the first line data LD1 of the (n−1)-th image frame (n−1) FRAME based on the restored first line data of the (n−2)-th image frame (n−2) FRAME.

The data correcting part 171 restores the second line data Ldd2 of the (n−2)-th image frame (n−2) FRAME, received during the third sub period T23, into original data. The data correcting part 171 corrects the second line data LD2 of the (n−1)-th image frame (n−1) FRAME based on the restored second line data of the (n−2)-th image frame (n−2) FRAME.

As previously described, during a second horizontal period H2 in which the second line data LD2 of the n-th image frame n FRAME is received, the data correcting part 171 corrects third and fourth line data LD3 and LD4 of the (n−1)-th image frame (n−1) FRAME and outputs the corrected third and fourth line data LD3 and LD4 of the (n−1)-th image frame (n−1) FRAME.

Therefore, in an exemplary embodiment, during a 560-th horizontal period corresponding to a middle of the image frame n FRAME in which 560-th line data is received, the data correcting part 171 corrects 1119-th and 1120-th line data of the (n−1)-th image frame (n−1) FRAME and outputs the corrected 1119-th and 1120-th line data of the (n−1)-th image frame (n−1) FRAME. In an exemplary embodiment, during a former half period of an n-th frame period n FP, the data processing part 102 outputs the (n−1)-th image frame (n−1) FRAME.

Referring to FIG. 10B, during a latter half period of the n-th frame period n FP, the data processing part 102 outputs the (n−1)-th image frame (n−1) FRAME once more.

Thus, the data processing part 102 outputs the corrected (n−1)-th image frame (n−1) FRAME twice during the n-th frame period n FP. Therefore, the data processing part 102 outputs the image frame data of 120 Hz into the image frame data of 240 Hz.

Figure 11:
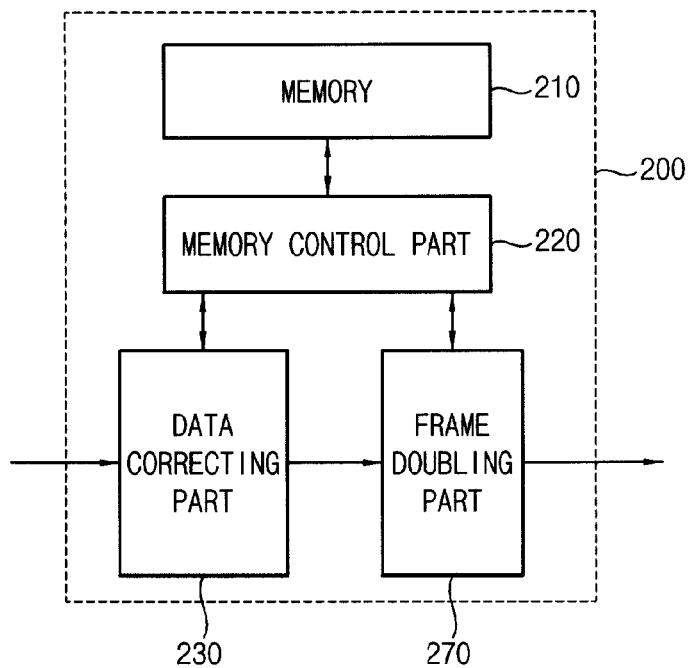
FIG. 11 is a block diagram illustrating exemplary embodiment of a data processing part according to the present invention.
Figure 12:
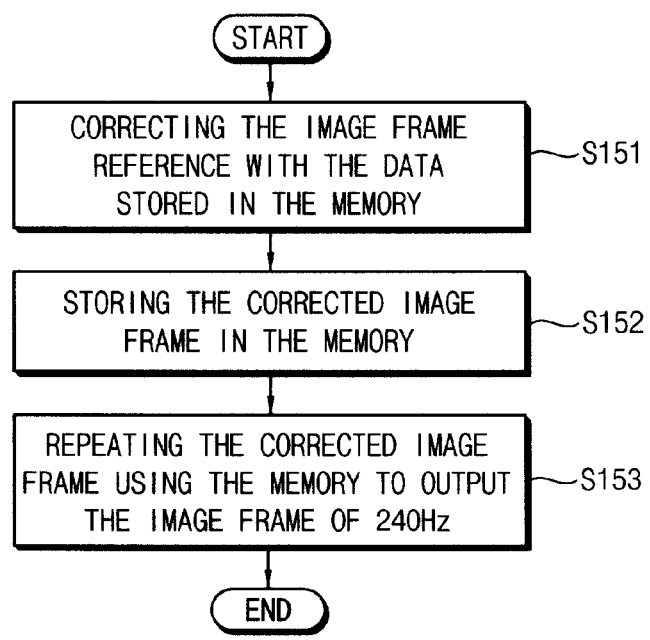
FIG. 12 is a flowchart illustrating an exemplary embodiment of a method for driving the data processing part of FIG. 11.

FIG. 11 is a block diagram illustrating an exemplary embodiment of a data processing part according to the present invention. FIG. 12 is a flowchart illustrating an exemplary embodiment of a method for driving the data processing part of FIG. 11.

Referring to FIGS. 11 and 12, the data processing part 200 includes a memory 210, a memory control part 220, a data correcting part 230 and a frame doubling part 270.

The data processing part 200 receives the image frame data of 120 Hz.

The memory 210 stores the received image frame data and the corrected image frame data corrected by the data correcting part 230. In an exemplary embodiment, the memory 210 is an external memory. In an exemplary embodiment, the memory 210 is SDRAM.

The memory control part 220 controls writing and reading of data in the memory 210. The control is performed for processing data of the data correcting part 230 and the frame doubling part 270.

The data correcting part 230 includes a LUT that stores correction data as a table type. The data correcting part 230 corrects the present frame data into a correction data based on the data stored in the memory 210 (step S151 in FIG. 12). In an exemplary embodiment, the correction data is over-driven or under-driven present frame data and is stored in the LUT. The data correcting part 230 stores the corrected image frame data in the memory 210 (step S152 in FIG. 12).

The frame doubling part 270 repeats the corrected data received from the data correcting part 230 using the memory 210 and outputs the image frame data of 240 Hz (step S153 in FIG. 12).

In an exemplary embodiment, in the 3D image mode, the data correcting part 230 corrects a left-eye image frame data (or a right-eye image frame data) of 120 Hz based on a previous right-eye image frame data (or a left-eye image frame data) stored in the memory 210. The data correcting part 230 outputs the corrected left-eye image frame data and the corrected right-eye image frame data, both at 120 Hz. The frame doubling part 270 repeats the corrected left-eye image frame data (or the corrected right-eye image frame data) of 120 Hz using the memory 210 to generate the corrected image frames data of 240 Hz. In an exemplary embodiment, the frame doubling part 270 outputs at 240 Hz the corrected first left-eye image frame data, second left-eye image frame data, first right-eye image frame data and second right-eye image frame data.

In the 2D image mode, the data correcting part 230 corrects an original image frame data (or an interpolation image frame data) of 120 Hz based on a previous image frame interpolation data (or an original image frame data) stored in the memory 210. The data correcting part 230 outputs the corrected original image frame data and the corrected interpolation image frame, data both at 120 Hz. The frame doubling part 270 repeats the corrected original image frame data (or the corrected interpolation image frame data) of 120 Hz using the memory 210 in order to generate the corrected image frames data of 240 Hz. In an exemplary embodiment, the frame doubling part 270 outputs at 240 Hz the corrected first original image frame data, second original image frame data, first interpolation image frame data and second interpolation image frame data.

Figure 13A:
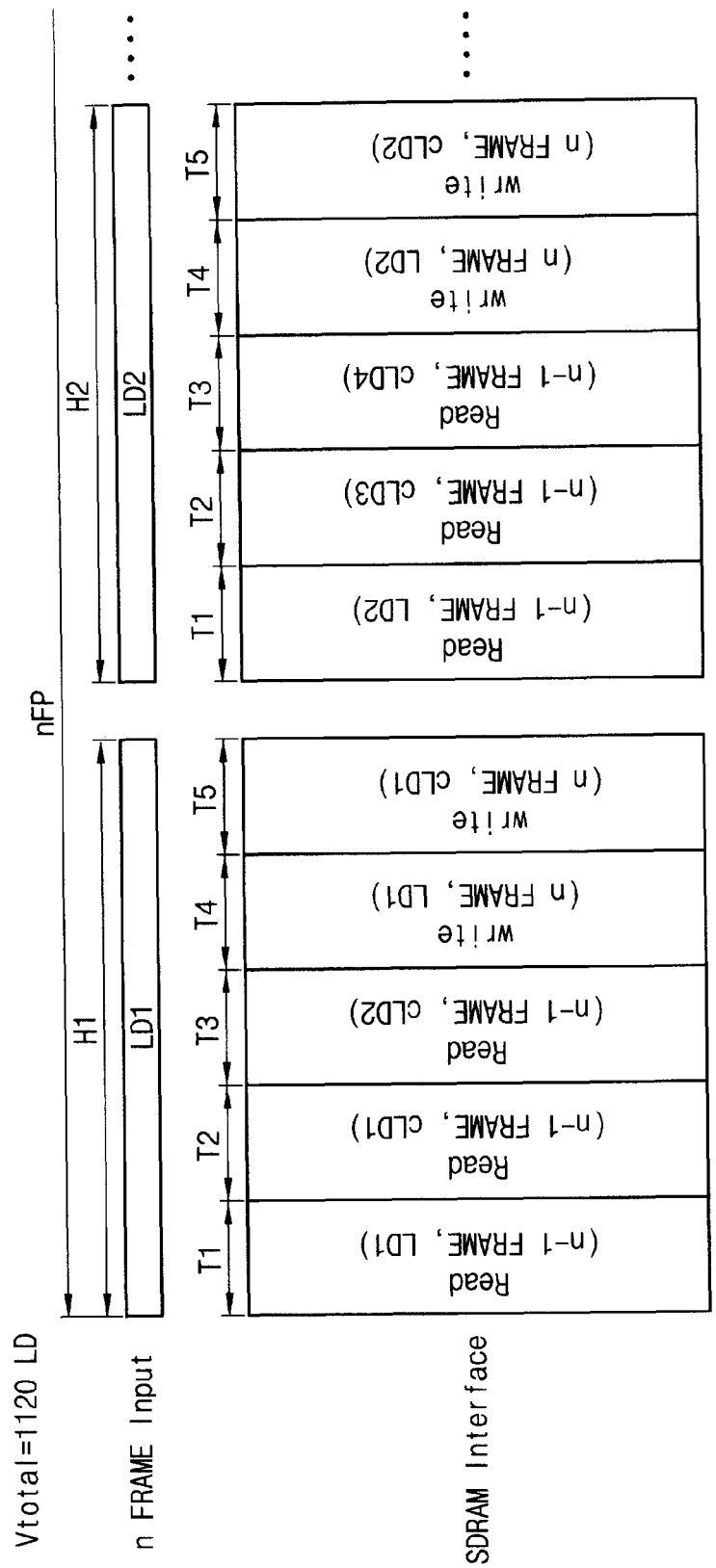
FIGS. 13A and 13B are exemplary timing diagrams illustrating input and output signals of the data processing part of FIG. 11.
Figure 13B:
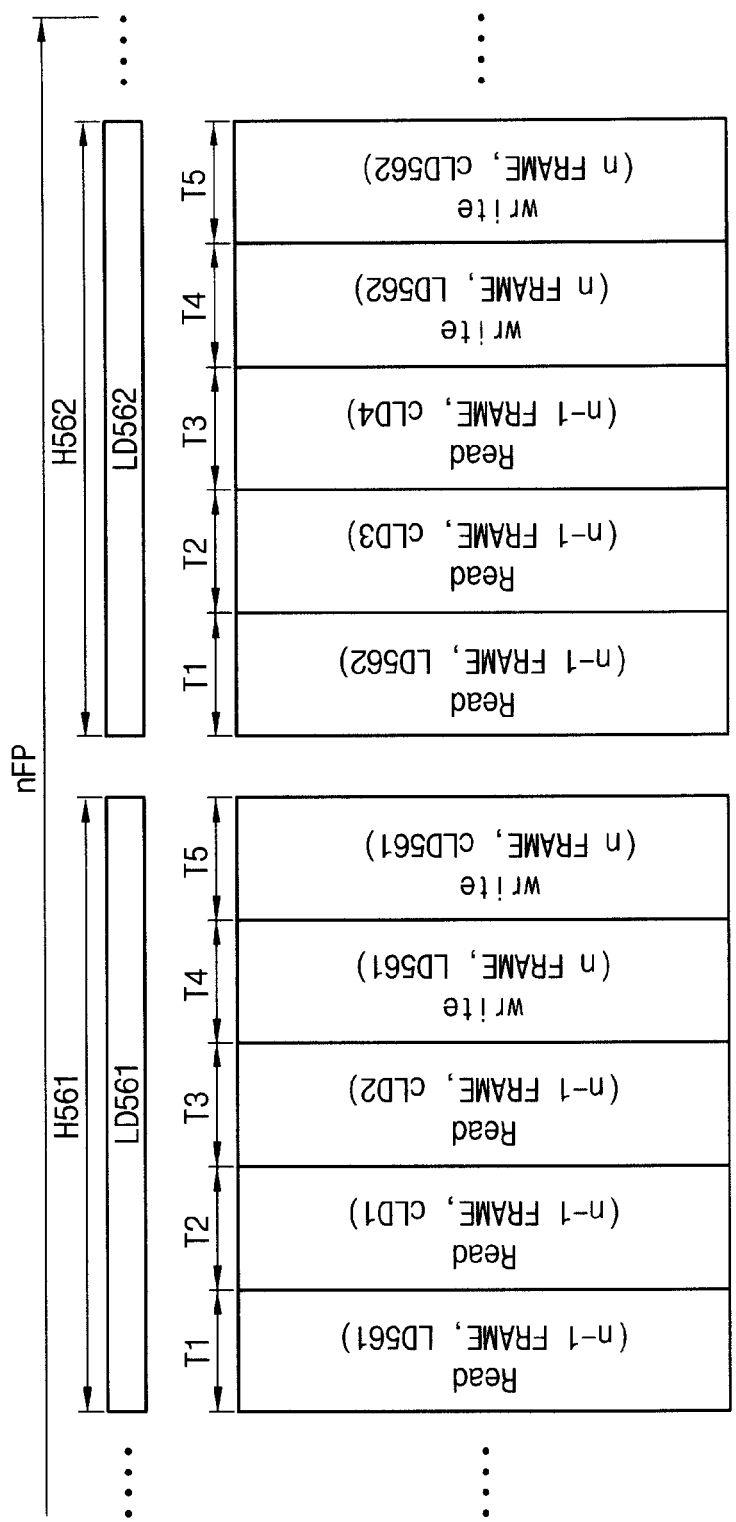

FIGS. 13A and 13B are exemplary timing diagrams illustrating input and output signals of the data processing part of FIG. 11. A horizontal axis (x-axis) indicates a time and a vertical axis (y-axis) indicates data in FIGS. 13A and 13B. The horizontal axis in FIG. 13B is extended from the horizontal axis in FIG. 13A.

Referring to FIGS. 11 and 13A, subsequently described is an operation of the data processing part 200 when an n-th image frame n FRAME having data of 1120 horizontal lines is received.

The memory control part 220 controls writing and reading of the memory 210. In an exemplary embodiment, the memory control part 220 writes the received data in the memory 210 and provides the read data, stored in the memory 210, to the data correcting part 230 and the frame doubling part 270.

In an exemplary embodiment, during a first horizontal period H1 in which first line data LD1 of the n-th image frame n FRAME is input, the memory control part 220 divides the first horizontal period H1 into 5 sub periods T1, T2, T3, T4, T5 and controls writing and reading of the memory 210 during each of the sub periods T1, T2, T3, T4, T5.

The memory control part 220 reads first line data LD1 of an (n−1)-th image frame (n−1) FRAME in the memory 210 and provides the first line data LD1 of the (n−1)-th image frame (n−1) FRAME to the data correcting part 230 during the first sub period T1.

The memory control part 220 reads first line data cLD1 of the (n−1)-th image frame (n−1) FRAME in memory 210 and provides the first line data cLD1 of the (n−1)-th image frame (n−1) FRAME to the frame doubling part 270 during the second sub period T2. The first line data cLD1 of the (n−1)-th image frame (n−1) FRAME is the corrected data.

The memory control part 220 reads second line data cLD2 of the (n−1)-th image frame (n−1) FRAME in memory 210 and provides the second line data cLD2 of the (n−1)-th image frame (n−1) FRAME to the frame doubling part 270 during the third sub period T3. The second line data cLD2 of the (n−1)-th image frame (n−1) FRAME is the corrected data.

During the fourth sub period T4, the memory control part 220 writes the first line data LD1 of the n-th image frame n FRAME in the memory 210. During the first to third sub periods T1 to T3, the first line data LD1 of the n-th image frame n FRAME is buffered.

During the fifth sub period T5, the memory control part 220 writes a first line data cLD1 of the n-th image frame n FRAME in the memory 210. The first line data cLD1 of the n-th image frame n FRAME the corrected data.

The data correcting part 230 corrects the first line data LD1 of the n-th image frame n FRAME based on the first line data LD1 of the (n−1)-th image frame (n−1) FRAME received during the first sub period T1. During the fifth sub period T5, the data correcting part 230 writes the corrected first line data cLD1 of the n-th image frame n FRAME in the memory 210.

During the second sub period T2 and the third sub period T3, the frame doubling part 270 receives the corrected first line data cLD1 and the corrected second line data cLD2 of the (n−1)-th image frame (n−1) FRAME. During the first horizontal period H1, the frame doubling part 270 outputs the corrected first line data cLD1 and the corrected second line data cLD2 of the (n−1)-th image frame (n−1) FRAME.

As previously described, during a second horizontal period H2 in which the second line data LD2 of the n-th image frame n FRAME is received, the frame doubling part 270 outputs the corrected third and fourth line data LD3 and LD4 of the (n−1)-th image frame (n−1) FRAME.

Therefore, in an exemplary embodiment, during a 560-th horizontal period corresponding to a middle of the image frame n FRAME in which 560-th line data is received, the data correcting part 171 corrects 1119-th and 1120-th line data of the (n−1)-th image frame (n−1) FRAME and outputs the corrected 1119-th and 1120-th line data of the (n−1)-th image frame (n−1) FRAME. In an exemplary embodiment, during a former half period of an n-th frame period n FP, the data processing part 200 outputs the (n−1)-th image frame (n−1) FRAME.

Referring to FIG. 13B, during a latter half period of the n-th frame period n FP, the frame doubling part 270 outputs the corrected (n−1)-th image frame (n−1) FRAME once more.

Thus, the data processing part 200 outputs the corrected (n−1)-th image frame (n−1) FRAME twice during the n-th frame period n FP. Therefore, the data processing part 200 outputs the image frame data of 120 Hz into the image frame data of 240 Hz.

Figure 14:
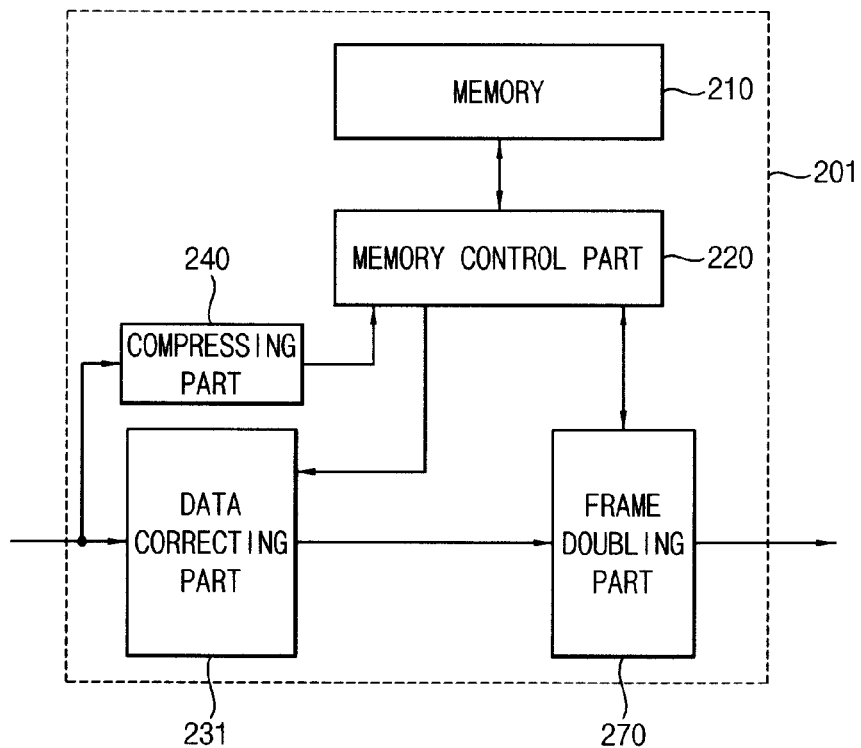
FIG. 14 is a block diagram illustrating exemplary embodiment of a data processing part according to the present invention.
Figure 15:
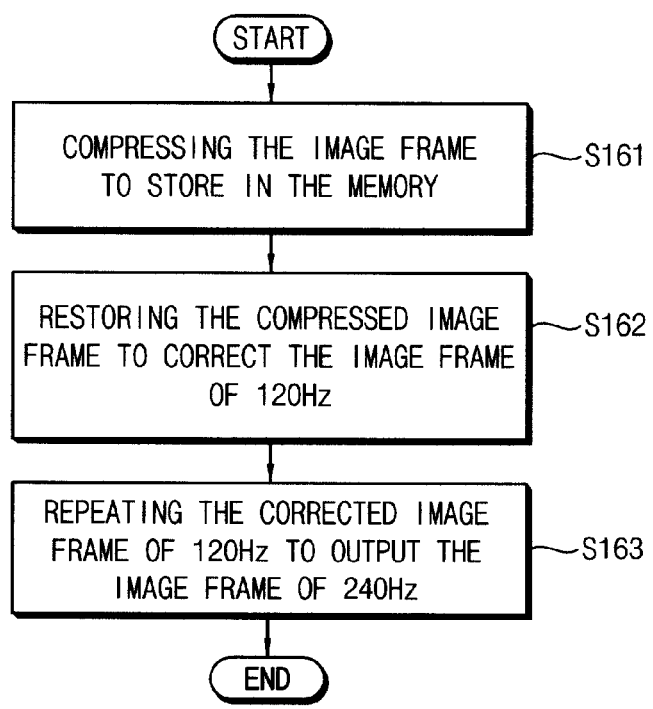
FIG. 15 is a flowchart illustrating an exemplary embodiment of a method for driving the data processing part of FIG. 14.

FIG. 14 is a block diagram illustrating an exemplary embodiment of a data processing part according to the present invention. FIG. 15 is a flowchart illustrating an exemplary embodiment of a method for driving the data processing part of FIG. 14.

Referring to FIGS. 14 and 15, the data processing part 201 includes a memory 210, a memory control part 220, a compressing part 240, a data correcting part 231 and a frame doubling part 270.

The data processing part 201 receives an image frame data of 120 Hz.

The memory 210 stores the compressed data compressed by the compressing part 240 and the corrected data corrected by the data correcting part 231. In an exemplary embodiment, the memory 210 is an external memory. In an exemplary embodiment, the memory 110 is SDRAM.

The memory control part 220 controls writing and reading of data in the memory 210. The control is performed for processing data of the data correcting part 231 and the frame doubling part 270.

The compressing part 240 compresses the image frame data, which, in an exemplary embodiment, is a reference data for use in the data correcting part 231, and stores the compressed data in the memory 210 (step S161 in FIG. 15). In an exemplary embodiment, a data loss due to a data compression has minimal effect on correction data generated by the data correcting part 231. In an exemplary embodiment, a data rate of the memory 210 is decreased by the data compression.

The data correcting part 231 includes a LUT that stores correction data as a table type and restores the compressed data into original data. The data correcting part 231 receives the previous frame compressed data stored in the memory 210 for correcting the present frame data. The data correcting part 231 restores the compressed data into the original data and uses the restored data as a reference data for the present frame data. The data correcting part 231 corrects the present frame data into a correction data based on the restored previous frame data (step S162 in FIG. 15). In an exemplary embodiment, the correction data is over-driven or under-driven present frame data and is stored in the LUT.

The frame doubling part 270 repeats the image frame data of 120 Hz corrected by the data correcting part 231 in order to generate the image frame data of 240 Hz using the memory 210 (step S163 in FIG. 15).

Figure 16A:
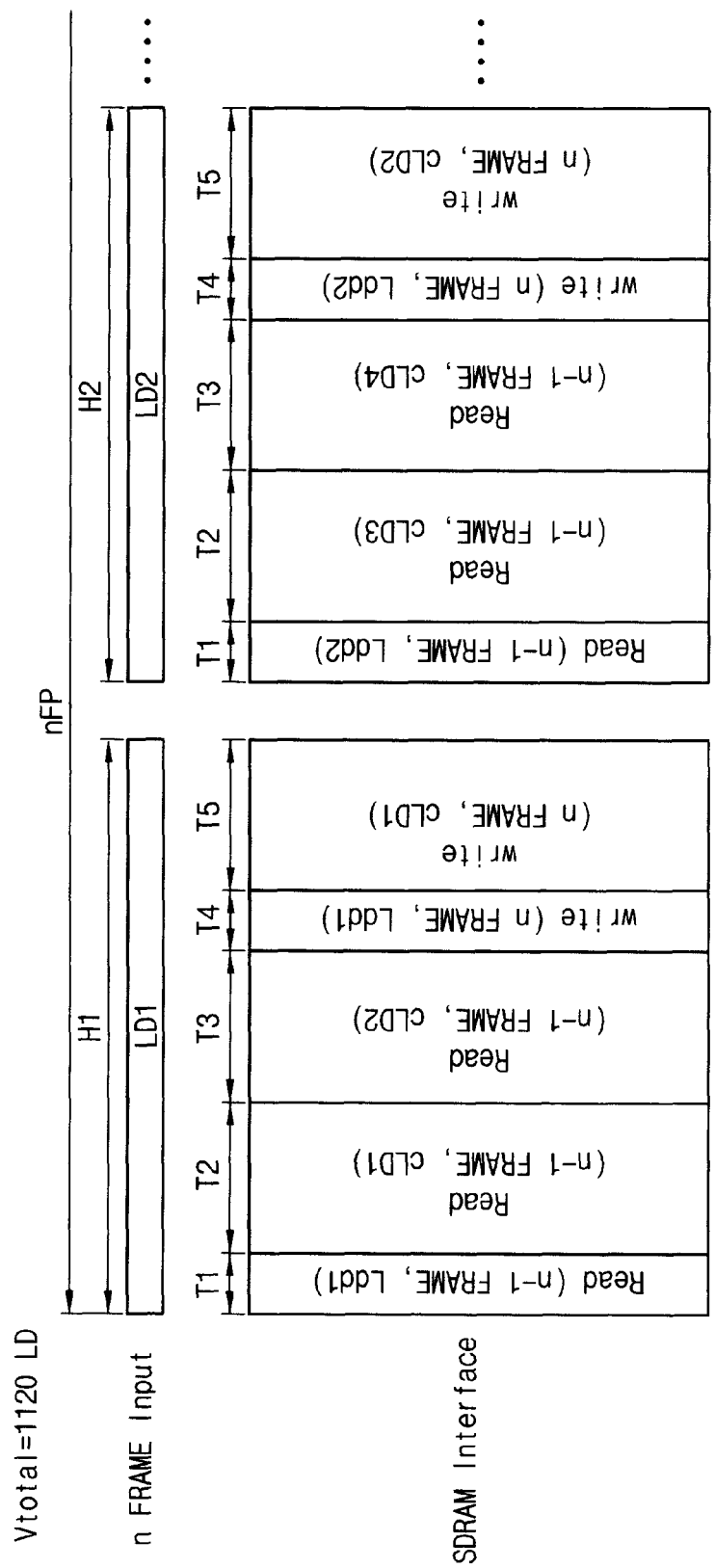

FIGS. 16A and 16B are exemplary timing diagrams illustrating input and output signals of the data processing part of FIG. 14. A horizontal axis (x-axis) indicates a time and a vertical axis (y-axis) indicates data in FIGS. 16A and 16B. The horizontal axis in FIG. 16B is extended from the horizontal axis in FIG. 16A.

Referring to FIGS. 14 and 16A, subsequently explained is an operation of the data processing part 201 when an n-th image frame n FRAME having data of 1120 horizontal lines is received.

The memory control part 220 controls writing and reading of the memory 210. In an exemplary embodiment, the memory control part 220 writes the compressed data in the memory 210 and provides the read data, stored in the memory 210, to the data correcting part 231 and the frame doubling part 270.

In an exemplary embodiment, during a first horizontal period H1 in which first line data LD1 of the n-th image frame n FRAME is input, the memory control part 220 divides the first horizontal period H1 into 5 sub periods T1, T2, T3, T4, T5 and controls writing and reading of the memory 210 during each of the sub periods T1, T2, T3, T4, T5.

The memory control part 220 reads first line data Ldd1 of an (n−1)-th image frame (n−1) FRAME in the memory 210 and provides the first line data Ldd1 of the (n−1)-th image frame (n−1) FRAME to the data correcting part 231 during the first sub period T1. The first line data Ldd1 of the (n−1)-th image frame (n−1) FRAME is the compressed data.

The memory control part 220 reads first line data cLD1 of the (n−1)-th image frame (n−1) FRAME in memory 210 and provides the first line data cLD1 of the (n−1)-th image frame (n−1) FRAME to the frame doubling part 270 during the second sub period T2. The first line data cLD1 of the (n−1)-th image frame (n−1) FRAME is the corrected data.

The memory control part 220 reads second line data cLD2 of the (n−1)-th image frame (n−1) FRAME in memory 210 and provides the second line data cLD2 of the (n−1)-th image frame (n−1) FRAME to the frame doubling part 270 during the third sub period T3. The second line data cLD2 of the (n−1)-th image frame (n−1) FRAME is the corrected data.

During the fourth sub period T4, the memory control part 220 writes the first line data Ldd1 of the n-th image frame n FRAME in the memory 210. The first line data Ldd1 of the n-th image frame n FRAME is the compressed data.

During the fifth sub period T5, the memory control part 220 writes first line data cLD1 of the n-th image frame n FRAME in the memory 210. The first line data cLD1 of the n-th image frame n FRAME is the corrected data.

The data correcting part 231 restores the first line data Ldd1 of the (n−1)-th image frame (n−1) FRAME received during the first sub period T1 into original data. The data correcting part 231 corrects the first line data LD1 of the n-th image frame n FRAME based on the restored first line data of the (n−1)-th image frame (n−1) FRAME. During the fifth sub period T5, the data correcting part 231 writes the corrected first line data cLD1 of the n-th image frame n FRAME in the memory 210.

During the second sub period T2 and the third sub period T3, the frame doubling part 270 receives the corrected first line data cLD1 and second line data cLD2 of the (n−1)-th image frame (n−1) FRAME. During the first horizontal period H1, the frame doubling part 270 outputs the corrected first line data cLD1 and second line data cLD2 of the (n−1)-th image frame (n−1) FRAME.

As previously described, during a second horizontal period H2 in which the second line data LD2 of the n-th image frame n FRAME is received, the frame doubling part 270 outputs the corrected third and fourth line data cLD3 and cLD4 of the (n−1)-th image frame (n−1) FRAME.

Therefore, in an exemplary embodiment, during a 560-th horizontal period corresponding to a middle of the image frame n FRAME in which 560-th line data is received, the data correcting part 171 corrects 1119-th and 1120-th line data of the (n−1)-th image frame (n−1) FRAME and outputs the corrected 1119-th and 1120-th line data of the (n−1)-th image frame (n−1) FRAME. In an exemplary embodiment, during a former half period of an n-th frame period n FP, the data processing part 201 outputs the (n−1)-th image frame (n−1) FRAME.

Referring to FIG. 16B, during a latter half period of the n-th frame period n FP, the data processing part 201 outputs the corrected (n−1)-th image frame (n−1) FRAME once more.

Thus, the data processing part 201 outputs the corrected (n−1)-th image frame (n−1) FRAME twice during the n-th frame period n FP. Therefore, the data processing part 200 outputs the image frame data of 120 Hz into the image frame data of 240 Hz.

Figure 17:
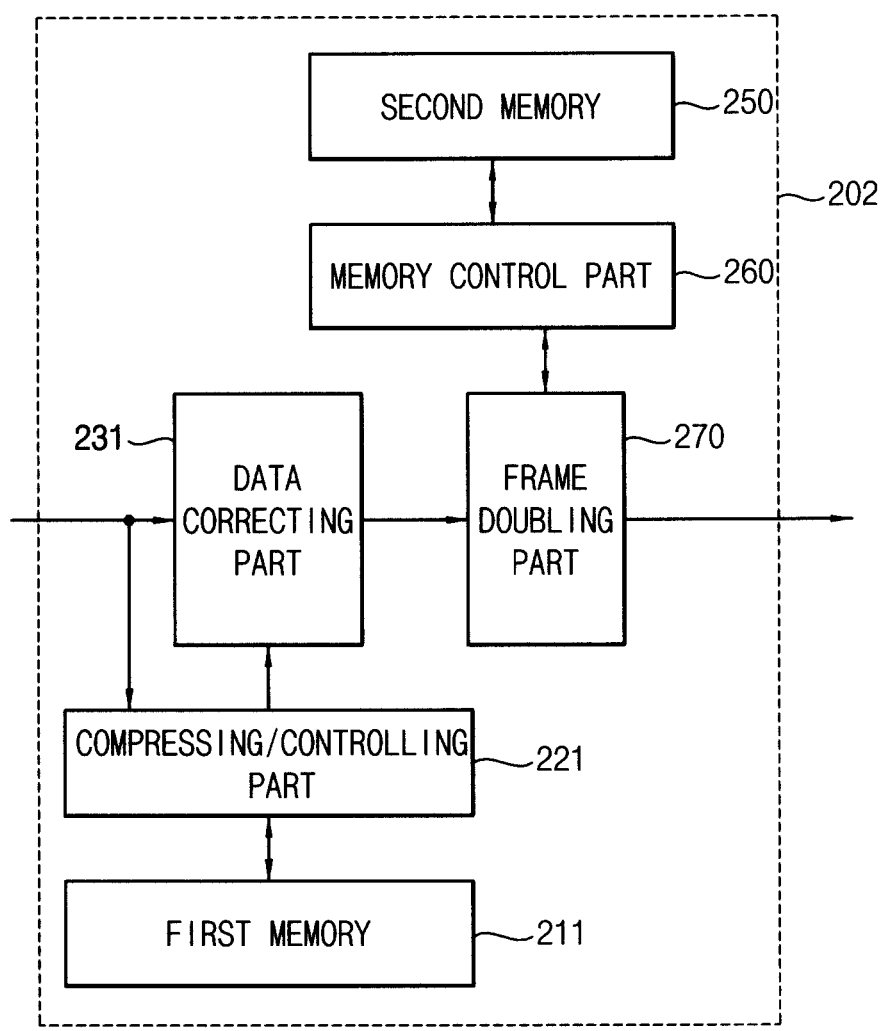
FIG. 17 is a block diagram illustrating an exemplary embodiment of a data processing part according to the present invention.
Figure 18:
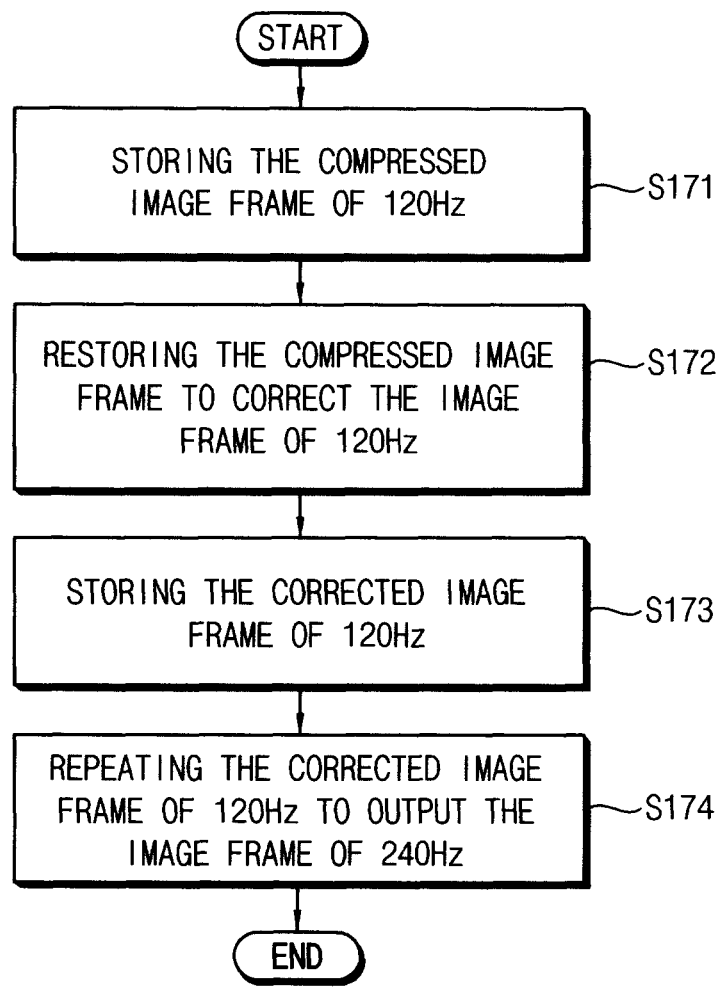
FIG. 18 is a flowchart illustrating an exemplary embodiment of a method for driving the data processing part of FIG. 17.

FIG. 17 is a block diagram illustrating an exemplary embodiment of a data processing part according to the present invention. FIG. 18 is a flowchart illustrating an exemplary embodiment of a method for driving the data processing part of FIG. 17.

Referring to FIGS. 17 and 18, the data processing part 202 includes a first memory 211, a compressing/controlling part 221, a data correcting part 231, a second memory 250, a memory control part 260 and a frame doubling part 270.

The data processing part 202 receives the image frame data of 120 Hz.

The first memory 211 stores the compressed image frame data of 120 Hz (step S171 in FIG. 18). In an exemplary embodiment, the first memory 211 is eDRAM.

The compressing/controlling part 221 compresses the image frame data and stores the compressed data in the first memory 211. The compressing/controlling part 221 controls writing and reading of the first memory 211. The control is performed for processing data of the data correcting part 231.

The data correcting part 231 includes a LUT that stores correction data as a table type and restores the compressed data into original data. The data correcting part 231 receives the previous frame compressed data stored in the first memory 211 for correcting the present frame data. The data correcting part 231 restores the compressed data into original data and uses the restored data as a reference data for the present frame data. The data correcting part 231 corrects the present frame data into a correction data based on the restored data (step S172 in FIG. 18). In an exemplary embodiment, the correction data is over-driven or under-driven present frame data and is stored in the LUT.

The second memory 250 stores the corrected image frame data (step S173 in FIG. 18).

The memory control part 260 controls writing and reading of the second memory 250 for processing data of the frame doubling part 270.

The frame doubling part 270 repeats the corrected image frame of 120 Hz stored in the second memory 250 to output the image frame of 240 Hz (step S174 in FIG. 18).

Figure 19A:
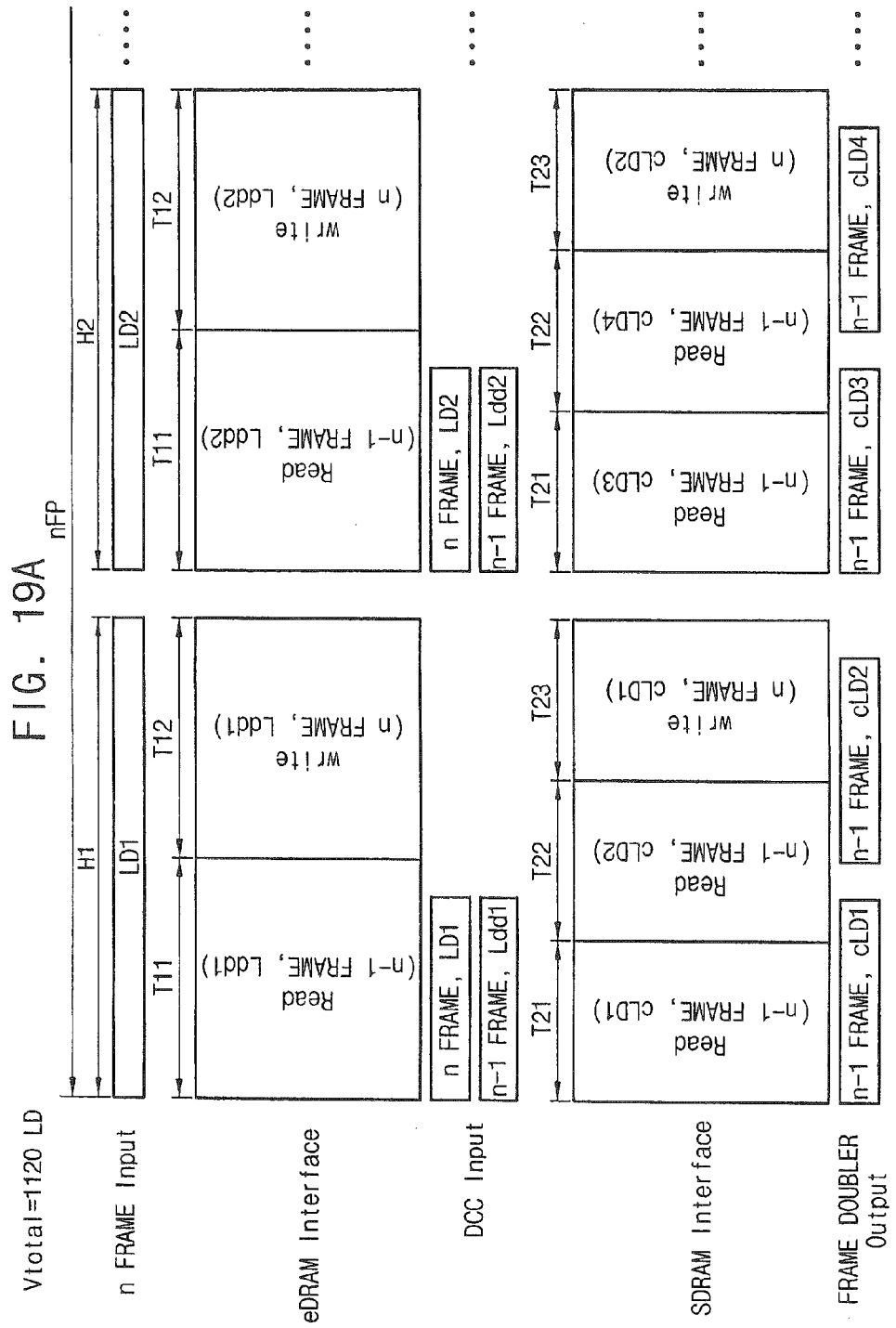
FIGS. 19A and 19B are exemplary timing diagrams illustrating input and output signals of the data processing part of FIG. 17.
Figure 19B:
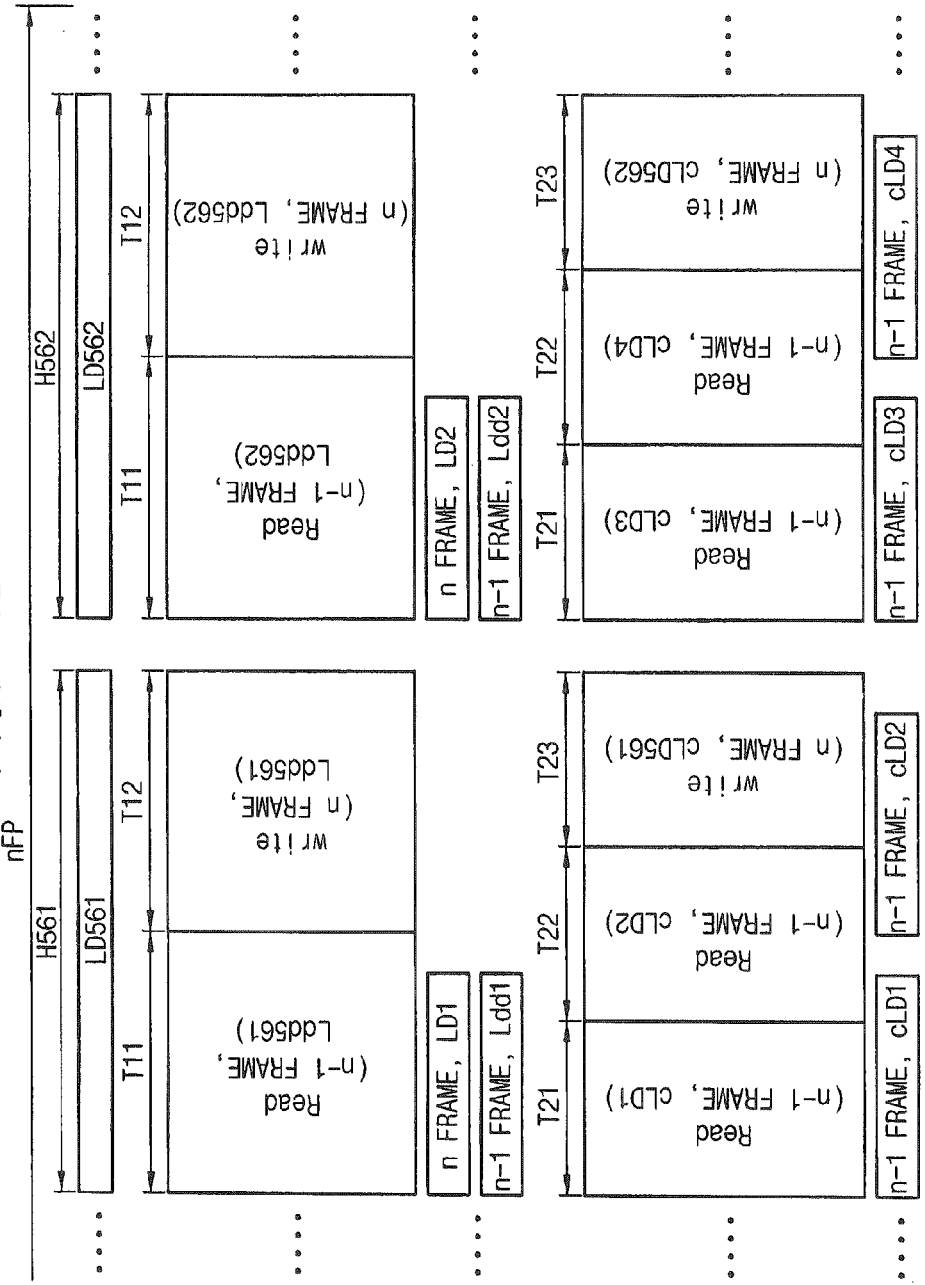

FIGS. 19A and 19B are exemplary timing diagrams illustrating input and output signals of the data processing part of FIG. 17. A horizontal axis (x-axis) indicates a time and a vertical axis (y-axis) indicates data in FIGS. 19A and 19B. The horizontal axis in FIG. 19B is extended from the horizontal axis in FIG. 19A.

Referring to FIGS. 17 and 19A, subsequently explained is an operation of the data processing part 202 when an n-th image frame n FRAME having data of 1120 horizontal lines is received.

The compressing/controlling part 221 controls writing and reading of the first memory 211. In an exemplary embodiment, the memory control part 221 writes the received data in the first memory 211 and provides the read data, stored in the first memory 211, to the data correcting part 231.

In an exemplary embodiment, during a first horizontal period H1 in which first line data LD1 of the n-th image frame n FRAME is input, the memory control part 220 divides the first horizontal period H1 into 2 sub periods T11, T12 and controls writing and reading of the first memory 211 during each of the sub periods T11, T12.

The compressing/controlling part 221 reads a first line data Ldd1 of an (n−1)-th image frame (n−1) FRAME in the first memory 211 and provides the first line data Ldd1 of the (n−1)-th image frame (n−1) FRAME to the data correcting part 231 during a first sub period T11. The first line data Ldd1 of the (n−1)-th image frame (n−1) FRAME is the compressed data.

During a second sub period T12, the compressing/controlling part 221 writes a first line data Ldd1 of an n-th image frame n FRAME in the first memory 211. The first line data Ldd1 of the n-th image frame n FRAME is the compressed data.

The data correcting part 231 restores the first line data Ldd1 of the (n−1)-th image frame (n−1) FRAME into original data. The data correcting part 231 corrects a first line data LD1 of an n-th image frame n FRAME based on the restored first line data of the (n−1)-th image frame (n−1) FRAME. The data correcting part 231 outputs the corrected first line data cLD1 of the n-th image frame n FRAME.

The memory control part 260 controls writing and reading of the second memory 250. In an exemplary embodiment, the memory control part 260 writes the corrected data to the second memory 250 and reads the corrected data from the second memory 250.

In an exemplary embodiment, during a first horizontal period H1 in which first line data of the n-th image frame n FRAME is input, the memory control part 260 divides the first horizontal period H1 into 3 sub periods T21, T22, T23 and controls writing and reading of the second memory 250 during each of the sub periods T21, T22, T23.

The memory control part 260 reads first line data cLD1 of an (n−1)-th image frame (n−1) FRAME in the memory 250 and provides the first line data cLD1 of the (n−1)-th image frame (n−1) FRAME to the frame doubling part 270 during the first sub period T21. The first line data cLD1 of the (n−1)-th image frame (n−1) FRAME is the corrected data.

The memory control part 260 reads second line data cLD2 of the (n−1)-th image frame (n−1) FRAME in the second memory 250 and provides the second line data cLD2 of the (n−1)-th image frame n-FRAME to the frame doubling part 270 during second sub period T21. The second line data cLD2 of the (n−1)-th image frame (n−1) FRAME is the corrected data.

During the third sub period T23, the memory control part 260 writes a first line data cLD1 of an n-th image frame n FRAME in the second memory 250. The first line data cLD1 of the n-th image frame n FRAME is the corrected data.

During the first sub period T21 and the second sub period T22, the frame doubling part 270 receives the corrected first line data cLD1 and the corrected second line data cLD2 of the (n−1)-th image frame (n−1) FRAME. During the first horizontal period H1, the frame doubling part 270 outputs the corrected first and second line data cLD1 and cLD2 of the (n−1)-th image frame (n−1) FRAME.

As previously described, during a second horizontal period H2 in which the second line data LD2 of the n-th image frame n FRAME is received, the frame doubling part 270 outputs the corrected third and fourth line data cLD3 and cLD4 of the (n−1)-th image frame (n−1) FRAME.

Therefore, in an exemplary embodiment, during a 560-th horizontal period corresponding to a middle of the image frame n FRAME in which 560-th line data is received, the data correcting part 171 corrects 1119-th and 1120-th line data of the (n−1)-th image frame (n−1) FRAME and outputs the corrected 1119-th and 1120-th line data of the (n−1)-th image frame (n−1) FRAME. In an exemplary embodiment, during a former half period of an n-th frame period n FP, the data processing part 202 outputs the (n−1)-th image frame (n−1) FRAME.

Referring to FIG. 19B, during a latter half period of the n-th frame period n FP, the data processing part 202 outputs the corrected (n−1)-th image frame (n−1) FRAME once more.

Thus, the data processing part 202 outputs the corrected (n−1)-th image frame (n−1) FRAME twice during the n-th frame period n FP. Therefore, the data processing part 200 outputs the image frame data of 120 Hz into the image frame data of 240 Hz.

Figure 20:
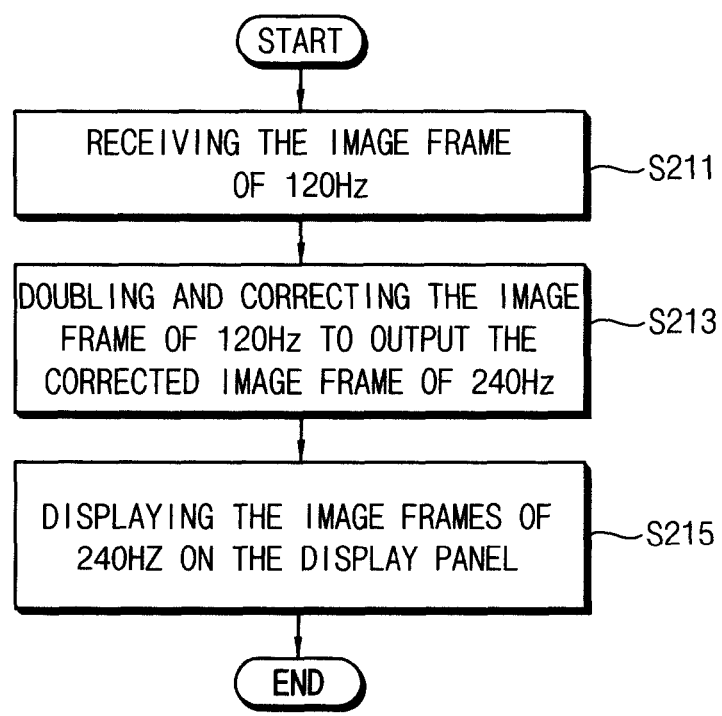
FIG. 20 is a flowchart illustrating an exemplary embodiment of a method for displaying an image according to the present invention.

FIG. 20 is a flowchart illustrating an exemplary embodiment of a method for displaying an image according to the present invention.

Referring to FIGS. 1 and 20, the data processing part 100 receives an image frame data of 120 Hz (step S211 in FIG. 20). The data processing part 100 doubles and corrects the image frame data of 120 Hz to output the corrected image frame data of 240 Hz (step S213 in FIG. 20). In an exemplary embodiment, the data processing part 100 is designed as any of the previously described exemplary embodiments.

In an exemplary embodiment, in the 3D image mode, the data processing part 100 doubles and corrects a left-eye image frame data and a right-eye image frame data, both at 120 Hz, to generate a first left-eye image frame data, a second left-eye image frame data, a first right-eye image frame data and a second right-eye image frame data, all at 240 Hz. In the 2D image mode, the data processing part 100 doubles and corrects an original image frame data and an interpolation image frame data, both at 120 Hz, processed via a motion estimation and motion compensation ("MEMC") technique in order to generate a first original image frame data, a second original image frame data, a first interpolation image frame data and a second interpolation image frame data, all at 240 Hz.

The panel control part 400 and the panel driving part 500 display the image frames data of 240 Hz received from the data processing part 100 on the display panel 700 (step S215 in FIG. 20).

Figure 21:
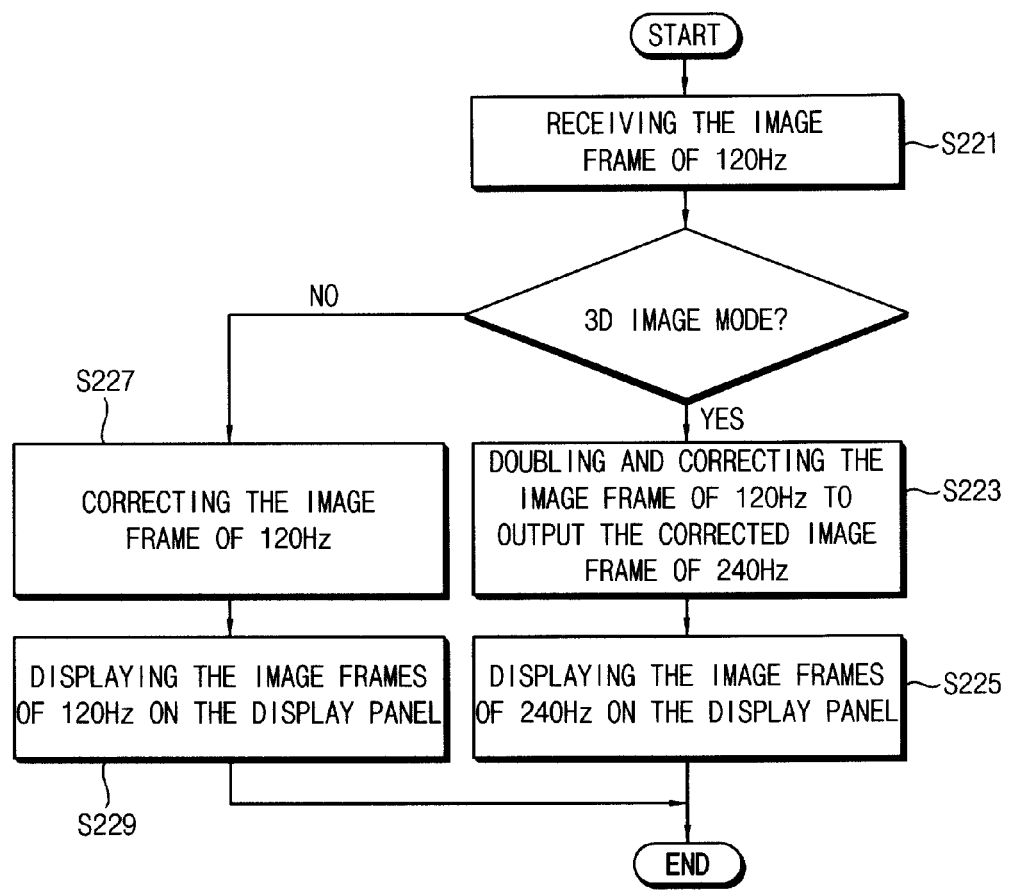
FIG. 21 is a flowchart illustrating an exemplary embodiment of a method for displaying an image according to the present invention.

FIG. 21 is a flowchart illustrating an exemplary embodiment of a method for displaying an image according to the present invention.

Referring to FIGS. 1 and 21, the data processing part 100 receives an image frame data of 120 Hz (step S221 in FIG. 21). In the 3D image mode, the data processing part 100 doubles and corrects a left-eye image frame data and a right-eye image frame data, both at 120 Hz, to generate a first left-eye image frame data, a second left-eye image frame data, a first right-eye image frame data and a second right-eye image frame data, all at 240 Hz (step S223 in FIG. 21). The panel control part 400 and the panel driving part 500 display the first left-eye image frame data, the second left-eye image frame data, the first right-eye image frame data and the second right-eye image frame data, all at 240 Hz, received from the data processing part 100 on the display panel 700 (step S225 in FIG. 21). The display panel 700 displays the image frames data with a frame frequency of 240 Hz. In an exemplary embodiment, the data processing part 100 is designed as any of the previously described exemplary embodiments.

In the 2D image mode, the data processing part 100 does not double an original image frame data and an interpolation image frame data, both at 120 Hz. In an exemplary embodiment, the data processing part 100 corrects the original image frame data and the interpolation image frame data, both at 120 Hz, for over-driving or under-driving in order to output the corrected original and interpolation image frames data, all at 120 Hz (step S227 in FIG. 21). The panel control part 400 and the panel driving part 500 display the corrected original and interpolation image frames data, all at 120 Hz, received from the data processing part 100 on the display panel 700 (step S229 in FIG. 21). The display panel 700 displays the image frames data with a frame frequency of 120 Hz.

Figure 22:
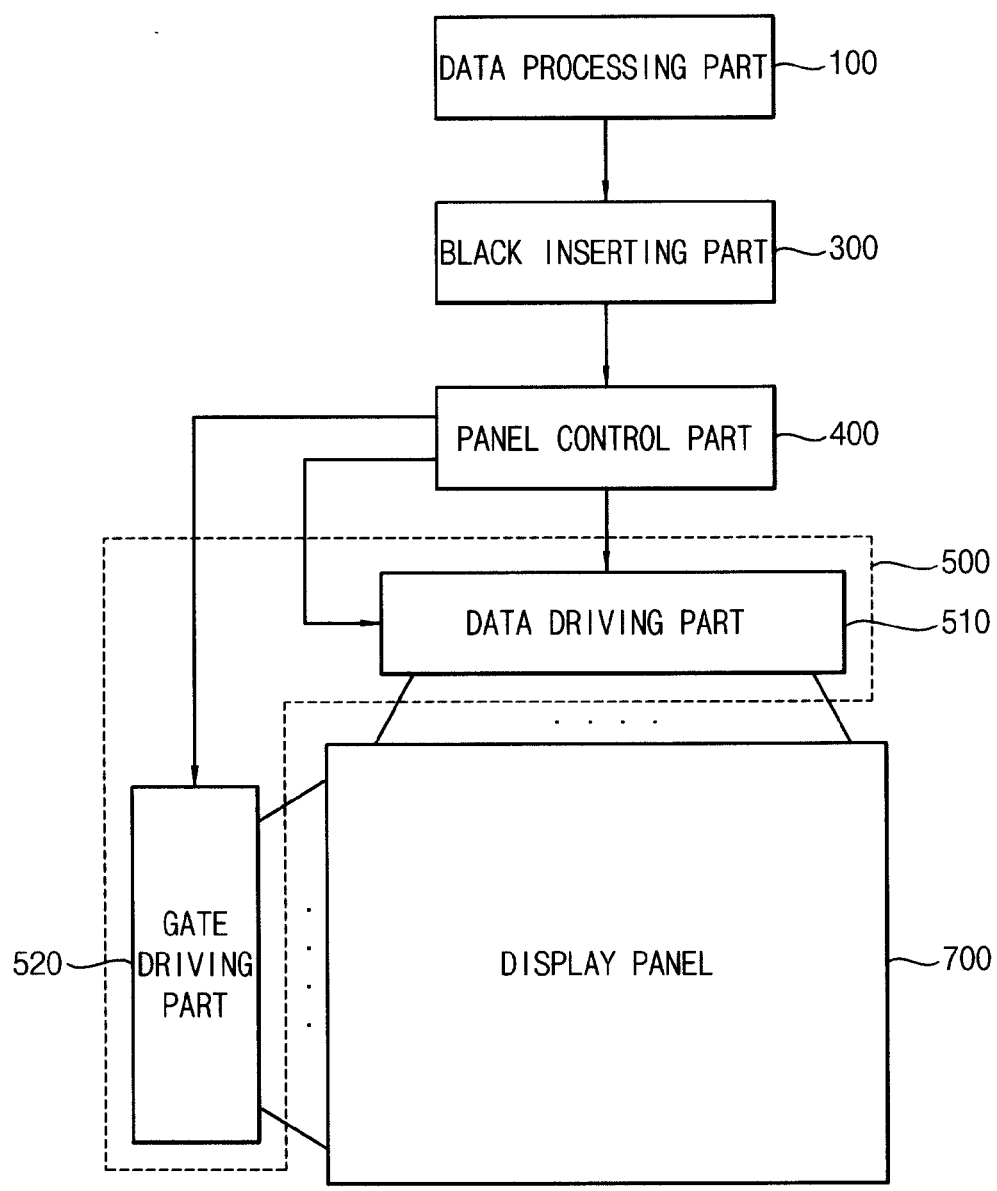
FIG. 22 is a block diagram illustrating an exemplary embodiment of a display apparatus according to the present invention.

FIG. 22 is a block diagram illustrating an exemplary embodiment of a display apparatus according to the present invention.

Referring to FIG. 22, the display apparatus includes a data processing part 100, a black inserting part 300, a panel control part 400, a panel driving part 500 and a display panel 700.

The data processing part 100 doubles and corrects an image frame data to generate a plurality of image frames data. In an exemplary embodiment, the data processing part 100 is designed as any of the previously described exemplary embodiments.

The black inserting part 300 inserts a black image frame data between a left-eye image frame data and a right-eye image frame data in the 3D image mode. In an exemplary embodiment, the black inserting part 300 receives a first left-eye image frame data, a second left-eye image frame data, a first right-eye image frame data and a second right-eye image frame data, all at 240 Hz, and inserts the black image frame data between the first left-eye image frame data and the first right-eye image frame data. Thus, the black inserting part 300 outputs the first left-eye image frame data, a first black image frame data, the first right-eye image frame data and a second black image frame data, all at 240 Hz.

The panel control part 400 provides image data and timing signals to the panel driving part 500.

The panel driving part 500 includes a data driving part 510 and a gate driving part 520. The data driving part 510 converts image data of a digital signal received from the panel control part 400 to a data voltage of an analog signal and provides the data voltage to the display panel 700 based on a data timing signal received from the panel control part 400. The gate driving part 520 provides a gate signal to the display panel 700 based on a gate timing signal received from the panel control part 400.

The display panel 700 includes a plurality of data lines, a plurality of gate lines crossing the data lines and a plurality of pixels. Each of the pixels includes a switching element connected to a data line, a gate line and a pixel electrode. The data voltages from the data driving part 510 are applied to data lines, and the gate signals from the gate driving part 520 are applied to the gate lines, so that the pixels display an image corresponding to the data voltages, respectively.

Figure 23:
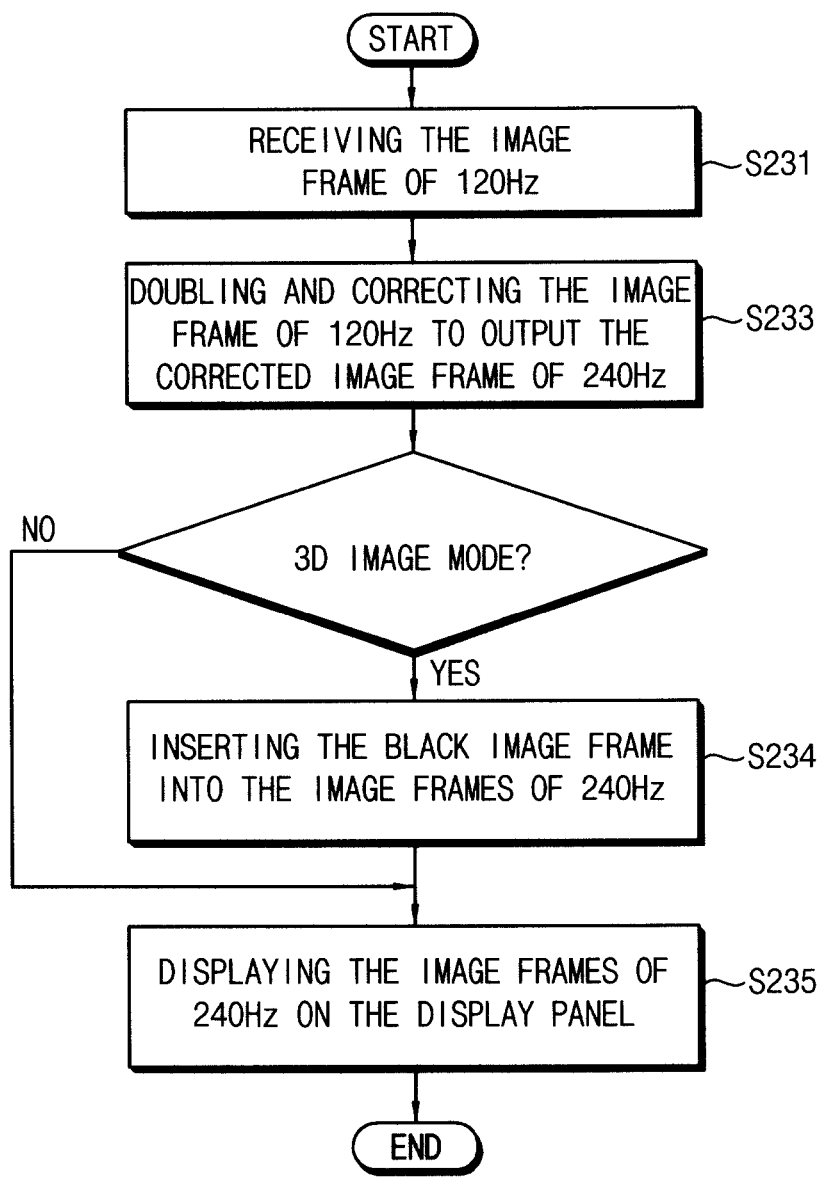
FIG. 23 is a flowchart illustrating an exemplary embodiment of a method for displaying the image by the display apparatus of FIG. 22.

FIG. 23 is a flowchart illustrating an exemplary embodiment of a method for displaying the image by the display apparatus of FIG. 22.

Referring to FIGS. 22 and 23, the data processing part 100 receives an image frame data of 120 Hz (step S231 in FIG. 23). The data processing part 100 doubles and corrects the image frame data of 120 Hz to output the image frame data of 240 Hz (step S233 in FIG. 23). In an exemplary embodiment, the data processing part 100 is designed as any of the previously described exemplary embodiments.

In an exemplary embodiment, in the 3D image mode, the data processing part 100 doubles and corrects a left-eye image frame data and a right-eye image frame data, both at 120 Hz, to generate a first left-eye image frame data, a second left-eye image frame data, a first right-eye image frame data and a second right-eye image frame data, all at 240 Hz.

In the 2D image mode, the data processing part 100 doubles and corrects an original image frame data and an interpolation image frame data, both at 120 Hz, processed via a MEMC technique in order to generate a first original image frame data, a second original image frame data, a first interpolation image frame data and a second interpolation image frame data, all at 240 Hz.

In the 3D image mode, the black inserting part 300 inserts the black image frame data between the left-eye image frame data and the right-eye image frame data in order to output the first left-eye image frame data, a first black image frame data, the first right-eye image frame data and a second black image frame data, all at 240 Hz (step S234 in FIG. 23).

In the 2D image mode, the black inserting part 300 bypasses the first original image frame data, the second original image frame data, the first interpolation image frame data and the second interpolation image frame data, all at 240 Hz.

The panel control part 400 and the panel driving part 500 display the image frames data of 240 Hz received from the black inserting part 300 on the display panel 700 (step S235 in FIG. 23). The display panel 700 displays the image frames data with a frame frequency of 240 Hz.

Figure 24:
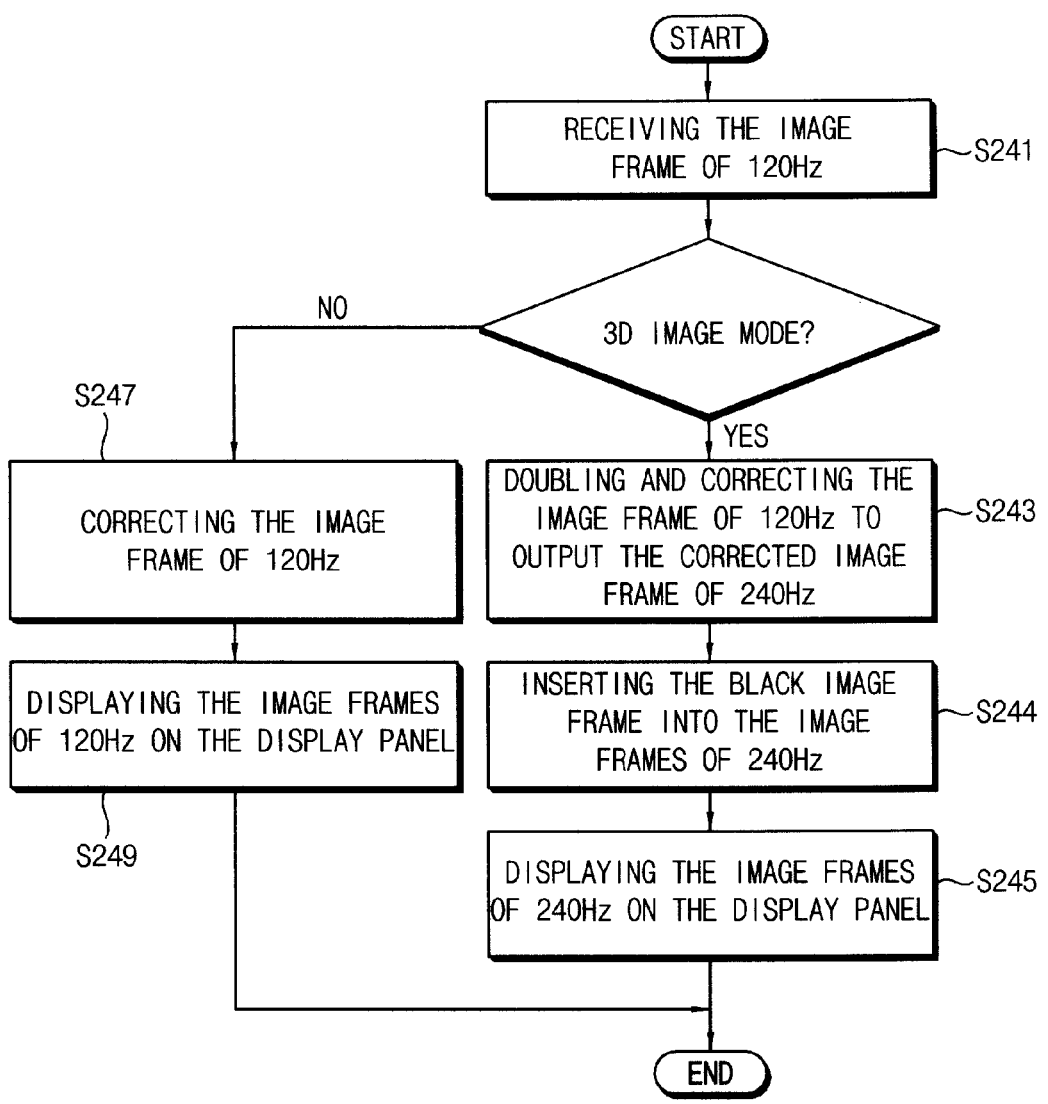
FIG. 24 is a flowchart illustrating an exemplary embodiment of a method for displaying an image according to the present invention.

FIG. 24 is a flowchart illustrating an exemplary embodiment of a method for displaying an image according to the present invention.

Referring to FIGS. 22 and 24, the data processing part 100 receives an image frame data of 120 Hz (step S241 in FIG. 24).

In the 3D image mode, the data processing part 100 doubles and corrects a left-eye image frame data and a right-eye image frame data, both at 120 Hz, in order to generate a first left-eye image frame data, a second left-eye image frame data, a first right-eye image frame data and a second right-eye image frame data, all at 240 Hz (step S243 in FIG. 24). The black inserting part 300 inserts the black image frame data between the left-eye image frame data and the right-eye image frame data to output the first left-eye image frame data, a first black image frame data, the first right-eye image frame data and a second black image frame data, all at 240 Hz (step S244 in FIG. 24). The panel control part 400 and the panel driving part 500 display the first left-eye image frame data, the first black image frame data, the first right-eye image frame data and the second black image frame data, all at 240 Hz, on the display panel 700 (step S245 in FIG. 24). The display panel 700 displays the image frames data with a frame frequency of 240 Hz.

In the 2D image mode, the data processing part 100 does not double an original image frame data and an interpolation image frame data, both at 120 Hz. In an exemplary embodiment, the data processing part 100 corrects the original image frame data and the interpolation image frame data, both at 120 Hz, for over-driving or under-driving in order to output the corrected original and interpolation image frames data of 120 Hz (step S247 in FIG. 24). The panel control part 400 and the panel driving part 500 display the corrected original and interpolation image frames data, both at 120 Hz, received from the data processing part 100 on the display panel 700 (step S249 inn FIG. 24). The display panel 700 displays the image frames data with a frame frequency of 120 Hz.

According to an exemplary embodiment of the present invention, the received image frame data is repetitively generated by using the memory so that an image frame data of a frequency higher than a frequency of the received image frame is generated.

Additionally, a memory storing data of a previous frame data via DCC is used as the memory repetitively generating the image frame data. Therefore, in an exemplary embodiment, a FRC repetitively generating the image frame data is omitted so that a cost of production may be decreased.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents, but also equivalent structures. Therefore, it is to be understood that the foregoing is illustrative of the present invention and is not to be construed as limited to the specific exemplary embodiments disclosed and that modifications to the disclosed exemplary embodiments, as well as other exemplary embodiments, are intended to be included within the scope of the appended claims. The present invention is defined by the following claims, with equivalents of the claims to be included therein.

What is claimed is:

1. A method of processing image data, the method comprising:

read-outing first line data of an (n−1)-th frame in a memory during a first sub period of a horizontal period in which first line data of an n-th frame is input;

read-outing first line data of an (n−2)-th frame in the memory during a second sub period of the horizontal period;

read-outing second line data of the (n−1)-th frame in the memory during a third sub period of the horizontal period;

read-outing second line data of the (n−2)-th frame in the memory during a fourth sub period of the horizontal period;

writing first line data of the n-th frame in the memory during a fifth sub period of the horizontal period;

correcting the first line data of the (n−1)-th frame read-out during the first sub period based on the first line data of the (n−2)-th frame read-out during the second sub period; and correcting the second line data of the (n−1)-th frame read-out during the third sub period based on the second line data of the (n−2)-th frame read-out during the fourth sub period, wherein corrected first and second line data of the (n−1)-th frame are outputted during the horizontal period.

2. The method of claim 1, further comprising:

compressing line data of a frame to store in the memory.

3. The method of claim 2, further comprising:
read-outing first line data of an (n−1)-th frame in a memory during the first sub period;
read-outing compressed first line data of an (n−2)-th frame in the memory during the second sub period of the horizontal period;
read-outing second line data of the (n−1)-th frame in the memory during the third sub period of the horizontal period;
read-outing compressed second line data of the (n−2)-th frame in the memory during the fourth sub period of the horizontal period,
writing first line data of the n-th frame in the memory during the fifth sub period of the horizontal period;
correcting the first line data of the (n−1)-th frame read-out during the first sub period based on restored first line data of the (n−2)-th frame read-out during the second sub period; and
correcting the second line data of the (n−1)-th frame read-out during the third sub period based on restored second line data of the (n−2)-th frame read-out during the fourth sub period.

4. The method of claim 1, wherein the frame included a left-eye frame including left-eye image data and a left-eye frame including left-eye image data.

5. The method of claim 4, further comprising:
displaying a first left-eye image frame, a second left-eye image frame, a first right-eye image frame and a second right-eye image frame on the display panel with the high frequency.

6. The method of claim 4, further comprising:
displaying a first left-eye image frame, a first black image frame, a first right-eye image frame and a second black image frame on the display panel with the high frequency.

7. A method of processing image data, the method comprising:
read-outing first line data of an (n−1)-th frame in a first memory during a first sub period of a first control period corresponding to a horizontal period in which first line data of an n-th frame is input;
read-outing second line data of an (n−2)-th frame in the first memory during a second sub period of the first control period;
writing first line data of the n-th frame in the first memory during a third sub period of the first control period;
compressing the first and second line data of an (n−1)-th frame read-out in a first memory to store in a second memory;
read-outing compressed first line data of an (n−2)-th frame in the second memory during a first sub period of a second control period corresponding to the horizontal period;
writing compressed first line data of the (n−1)-th frame in the second memory during a second sub period of the second control period,
read-outing compressed second line data of the (n−2)-th frame in the second memory during a third sub period of the second control period;
writing compressed second line data of the (n−1)-th frame in the second memory during a fourth sub period of the second control period;
correcting the first line of data of the (n−1)-th frame read-out during the first sub period based on restored first line data of the (n−2)-th frame read-out during the second sub period; and
restoring the compressed second line data of the (n−2)-th frame read-out during the fourth sub period.

8. A method of processing image data, the method comprising:
read-outing first line data of an (n−1)-th frame in a memory during a first sub period of a horizontal period in which first line data of an n-th frame is input;
read-outing corrected first line data of the (n−1)-th frame in the memory during a second sub period of the horizontal period;
read-outing corrected second line data of the (n−1)-th frame in the memory during a third sub period of the horizontal period;
writing first line data of an n-th frame in the memory during a fourth sub period of the horizontal period;
correcting the first line data of the n-th frame based on the first line data of the (n−1)-th frame read-out during the first sub period; and
writing corrected first line data of the n-th frame in the memory during a fifth sub period of the horizontal period,
wherein corrected first and second line data of the (n−1)-th frame are outputted during the horizontal period.

9. The method of claim 8, further comprising:
compressing line data of a frame to store in the memory.

10. The method of claim 9, further comprising: read-outing compressed first line data of an (n−1)-th frame in a memory during a first sub period of a horizontal period in which first line data of an n-th frame is input;
read-outing corrected first line data of the (n−1)-th frame in the memory during a second sub period of the horizontal period;
read-outing corrected second line data of the (n−1)-th frame in the memory during a third sub period of the horizontal period;
writing compressed first line data of an n-th frame in the memory during a fourth sub period of the horizontal period,
correcting the first line data of the n-th frame based on restored first line data of the (n−1)-th frame read-out during the first sub period; and
writing corrected first line data of the n-th frame in the memory during a fifth sub period of the horizontal period.

11. The method of claim 6, wherein the frame includes a left-eye frame including left-eye image data and a left-eye frame including left-eye image data.

12. A method of processing image data, the method comprising:
compressing line data of an n-th frame;
read-outing compressed first line data of an (n−1)-th frame in a first memory during a first sub period of a first control period corresponding to a horizontal period in which first line data of an n-th frame is input;
writing compressed first line data of the n-th frame in the first memory during a second sub period of the first control period;
correcting first line data of the n-th frame based on restored first line data of the (n−1)-th frame read-out during the first sub period;
read-outing corrected first line data of the (n−1)-th frame in the memory during a second sub period of the horizontal period;
storing corrected line data in a second memory;
read-outing corrected first line data of the (n−1)-th frame in the second memory during a first sub period of a second control period corresponding to the horizontal period;

read-outing corrected second line data of the (n−1)-th frame in the second memory during a second sub period of the second control period; and writing corrected first line data of the n-th frame in the second memory during a third sub period of the second control period.

13. A display apparatus comprising:

a display panel which displays an image;

a memory which stores line data of a frame with a low frequency;

a memory controlling part which controls the memory a frame doubling part which repetitively outputs the line data of the frame with a high frequency;

a data correcting part which corrects the line data of the frame; and a panel driving part which displays an image frame based on frame data on the display panel with the high frequency, wherein the memory controlling part read-outs first line data of an (n−1)-th frame in a memory during a first sub period of a horizontal period in which first line data of an n-th frame is input, read-outs first line data of an (n−2)-th frame in the memory during a second sub period of the horizontal period, read-outs second line data of the (n−1)-th frame in the memory during a third sub period of the horizontal period, read-outs second line data of the (n−2)-th frame in the memory during a fourth sub period of the horizontal period and writes first line data of the n-th frame in the memory during a fifth sub period of the horizontal period, and the data correcting part corrects the first line data of the (n−1)-th frame read-out during the first sub period based on the first line data of the (n−2)-th frame read-out during the second sub period, and corrects the second line data of the (n−1)-th frame read-out during the third sub period based on the second line data of the (n−2)-th frame read-out during the fourth sub period.

14. The display apparatus of claim 13, wherein the frame includes a left-eye frame including left-eye image data and a left-eye frame including left-eye image data, wherein the panel driving part which displays a first left-eye image frame, a second left-eye image frame, a first right-eye image frame and a second right-eye image frame on the display panel.

15. The display apparatus of claim 13, further comprising:

a black inserting part which inserts a black image frame between a left-eye image frame and a right-eye image frame, and the panel driving part which displays the left-eye image frame, the black image frame, the right-eye image frame and the black image frame on the display panel.

16. The display apparatus of claim 13, further comprising:

a compressing part which compresses the line data of the frame to store in the memory, wherein the memory controlling part read-outs first line data of an (n−1)-th frame in a memory during the first sub period, read-outs compressed first line data of an (n−2)-th frame in the memory during the second sub period of the horizontal period, read-outs second line data of the (n−1)-th frame in the memory during the third sub period of the horizontal period, read-outs compressed second line data of the (n−2)-th frame in the memory during the fourth sub period of the horizontal period and writes first line data of the n-th frame in the memory during the fifth sub period of the horizontal period, and the data correcting part corrects the first line data of the (n−1)-th frame read-out during the first sub period based on restored first line data of the (n−2)-th frame read-out during the second sub period, and corrects the second line data of the (n−1)-th frame read-out during the third sub period based on restored second line data of the (n−2)-th frame read-out during the fourth sub period.

17. A display apparatus comprising:

a first memory which stores line data of a frame with a low frequency;

a frame doubling part which repetitively outputs the line data of the frame with a high frequency;

a data correcting part which corrects the line data of the frame;

a panel driving part which displays an image frame based on the line data of the frame with the high frequency;

a second memory; and a compressing/controlling part which compresses the line data of the frame to store in the second memory, wherein the first memory controlling part read-outs first line data of an (n−1)-th frame in a memory during a first sub period of a horizontal period in which first line data of an n-th frame is input, read-outs corrected first line data of the (n−1)-th frame in the memory during a second sub period of the horizontal period, read-outs corrected second line data of the (n−1)-th frame in the memory during a third sub period of the horizontal period and writes first line data of an n-th frame in the memory during a fourth sub period of the horizontal period, the data correcting part corrects the first line data of the n-th frame based on the first line data of the (n−1)-th frame read-out during the first sub period, and the compressing/controlling part writes corrected first line data of the n-th frame in the memory during a fifth sub period of the horizontal period.

* * * * *